United States Patent [19]
Quaglia

[11] Patent Number: 5,871,262
[45] Date of Patent: Feb. 16, 1999

[54] PRECISION SUPER HIGH STRENGTH WHEEL, ROLLER AND TRACK TREAD CONSISTING OF ISOPLAST OR VICTREX PEEK WITH PURE CARBON FIBER CONTENT, AND WITH COMMERCIAL CARBON FIBERS FORMING AN ALLOY ON AN IMPROVED TREAD LOCKING INSERT WHEEL HUB

[76] Inventor: Lawrence D. Quaglia, 917 Quincy Ave., Bronx, N.Y. 10465

[21] Appl. No.: 692,512

[22] Filed: Aug. 6, 1996

Related U.S. Application Data

[63] Continuation-in-part of Ser. No. 27,081, Mar. 5, 1993, Pat. No. 5,542,752.

[51] Int. Cl.$^6$ ..................................................... B60B 5/02
[52] U.S. Cl. .......................... 301/64.7; 301/5.3; 152/323; 152/393
[58] Field of Search ............................ 301/5.3, 5.7, 64.7, 301/95; 152/323, 324, 325, 326, 327, 328, 329, 393, 394; 492/45, 53, 59

[56] References Cited

U.S. PATENT DOCUMENTS

| | | | |
|---|---|---|---|
| 1,067,361 | 7/1913 | Midgley | 152/393 X |
| 1,169,575 | 1/1916 | Seidel | 152/393 |
| 1,814,623 | 7/1931 | Finnell | 152/393 X |
| 3,076,352 | 2/1963 | Larsh | 74/443 |
| 3,895,844 | 7/1975 | Merbler | 301/5.7 |
| 4,045,046 | 8/1977 | Taylor et al. | 305/5.7 X |
| 4,095,846 | 6/1978 | Agins | 152/323 X |
| 4,153,303 | 5/1979 | Tanner | 152/323 X |
| 4,535,827 | 8/1985 | Seaford | 152/323 X |
| 5,035,314 | 7/1991 | Kornylak | 301/5.7 X |

*Primary Examiner*—Russell D. Stormer
*Attorney, Agent, or Firm*—Lawrence D. Quaglia

[57] ABSTRACT

A precision wheel, roller and track tread product newly developed consisting of a wheel, roller and track tread material capable of carrying a very heavy load for its size mounted on a new tread locking assembly hub, roller shaft or track tread cleat. The tread locking assembly is designed primarily to bond very difficult to bond materials to a given wheel hub or wheel rim without an adhesive which could be used for commercial, industrial, automotive, and all other purposes where a revolutionary state-of-the-art wheel product is needed. The resultant benefits of the tread alloys with the use of a newly invented tread retention device with super holding power is an inner tube perforated liner mounted over a circular groove derived from a precisionly designed tread locking assembly from specific mathematical, scientific tests and mathematical calculations. These mathematical advantages are a product of groove design dimensions. Another part of the invention is to bring together the wheel tread locking invention with newly developed state-of-the-art engineering thermoplastic polyurethane resins designated as Isoplast$^R$ grade 202 or Victrex Peek$^R$ 450G used in their present forms and when used as matrixes being alloyed with C-60, C-76 pure carbon fiber content or commercial carbon fibers with specifications far superior to that of any conventional material that can be used for wheel, roller or track tread material forming a new product that has been needed for a very long time.

7 Claims, 15 Drawing Sheets

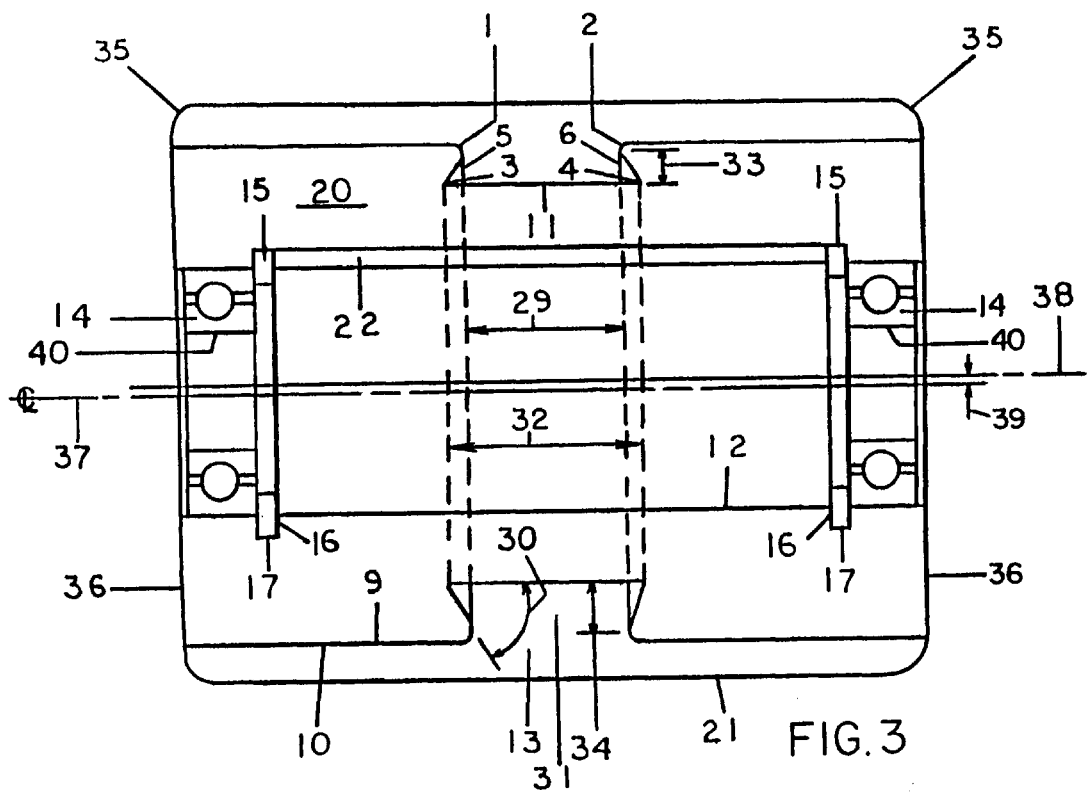
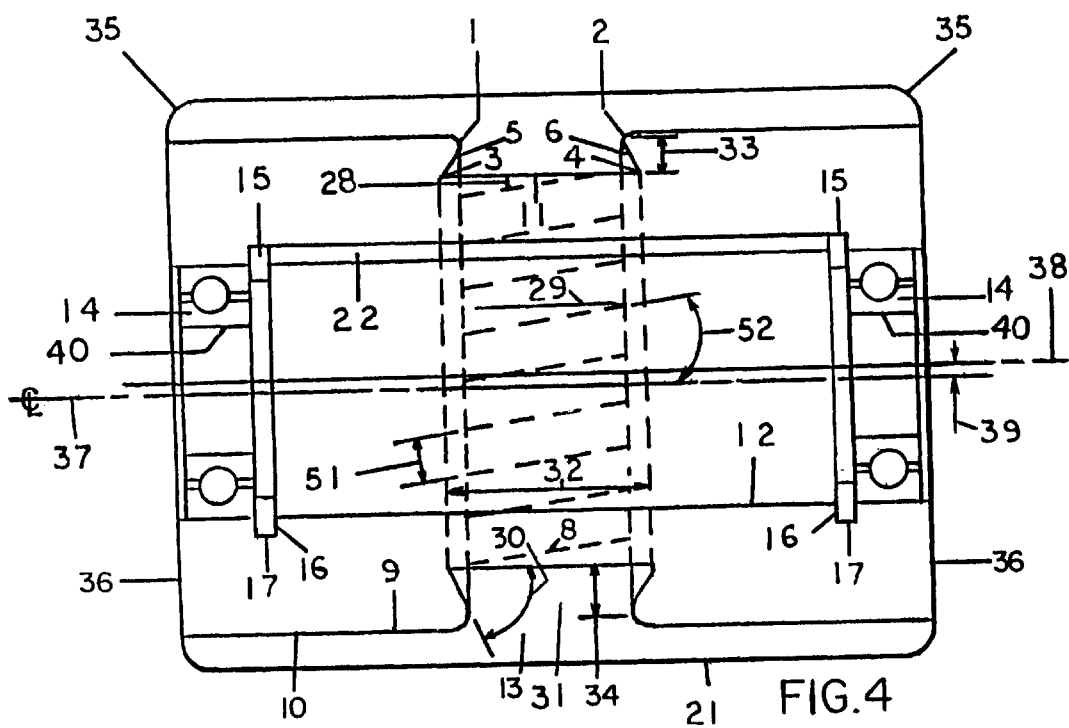

PRECISION SUPER HIGH STRENGTH WHEEL, ROLLER AND TRACK TREAD CONSISTING OF ISOPLAST OR VICTREX PEEK WITH PURE CARBON FIBER CONTENT, AND WITH COMMERCIAL CARBON FIBERS FORMING AN ALLOY ON AN IMPROVED TREAD LOCKING INSERT WHEEL HUB

The Following is a Continuation in Part of patent application Ser. No. 08/027,081 originally filed Mar. 5, 1993, now U.S. Pat. No. 5,542,752, herein incorporated by reference.

FIELD OF THE INVENTION

The present invention provides the best bonding for a wheel, roller, and track tread material to a wheel hub, shaft, or track tread plate mounting assembly, or other wheel rim assemblies. It makes use of new principles of design for use with the Isoplast$^R$ 202 and Victrex Peek$^R$ used for improved wheel, roller, and track tread material in their conventional forms, and for use as matrixes to hold the pure carbon fibers designated as C-60, C-76 and commercial carbon fibers e.g. Thornel$^R$, to form new alloys with the pure carbon fiber content, and with commercial carbon fibers forming additional alloys of super strength, used with a new tread locking circular suspended perforated tube liner located between the outer wheel hub circumferance and the inner surface of the outer wheel tread. The treadlocking device can be used without any groove, or with one or more grooves of minimum depth either concentric or eccentric to the center of rotation located on the circumferance of the wheel hub or roller shaft.

Another material known as Penlon$^R$ a Teflon$^R$ type of material can be added to the Isoplast$^R$ 202 or Victrex Peek$^R$ matrixes to provide additional abrasion resistance for the tread material.

Together these create a new wheel product consisting of two new items; one, the wheel, roller and track tread consisting of Isoplast$^R$ 202, and an alternate Victrex Peek$^R$, and their use as matrixes each with the circular suspended perforated tube liner, and also compounded with the pure carbon C-60 and its alternate form C-76 to be compounded into small micron size to be further compounded with motor oil to form a new lubricant which can be mixed with conventional motor oil or to replace same. This can also be achieved using commercial carbon fiber content in place of the C-60 and C-76. The use of these carbon fiber contents creates an alloy forming a new new full capacity load wheel, roller and track tread. A safety factor higher than the previous two is achieved, to date. My invention achieves this without any other polyurethane load wheel being available with at least a full load rating and equal safety factor of one, and providing many benefits while being chemically resistant to harmful chemicals. The following material was mentioned in Disclosure Documents Numbers 276196 dated Mar. 5, 1991 and 276157 dated Mar. 14, 1991.

BACKGROUND OF THE INVENTION

There have been various tread locking devices disclosed in the prior art.

Examples of the prior art are U.S. Pat. Nos.: 4,246,947 to Ewing, dated Jan. 27, 1981; 2,152,684 to E. A. Grange, dated Apr. 4, 1939; 2,152,685 to E. A. Grange, dated Apr. 4, 1939; 1,943,881 to R. R. Ware, dated Jan. 16, 1934; 1,0577462 to F. W. Kremer, dated Apr. 1, 1913; 848,745 to J. E. Hopkinson, dated Apr. 2, 1907; 824,345 to M. A. Elliott, dated Jun. 26, 1906; 813,423 to E. Hill, dated Feb. 27, 1906; 771,947 to J. A. Swinehart, dated Oct. 11, 1904.

The previous prior art affords only marginal performance under limited conditions. The average polyurethane wheels are harder than rubber but still resillient while providing a co-efficient of friction less than rubber for traction, but are higher in load rating when compared to the rubber wheels. The present invention using Isoplast$^R$ 202 and Victrex Peek$^R$ is far superior in that basically, its load rating is many times higher than the best polyurethane wheels, which also benefits from a newly structured design with additional parts providing the best tread locking possible along with the highest load rating possible, for a polyurethane wheel product and another feature is that a new type of wheel is created for the automotive and materials handling industry; namely, the best wheel, roller and track tread used for all types of applications wherever a wheel, roller, or track tread is needed regardless of size or type of use, an example is the best pallet jack load wheel to date, with a sufficient safety factor of at least 2 and as high as 4 for the load rating, in the polyurethane class of wheels used on electric pallet jack machines. This safety factor enables the driven electric pallet jack machines to carry their rated load, not a partial load as for conventional load wheels. The present invention operates under all weather conditions. The present invention can be applied to all types of wheels, industrial, automotive, and rollers for all types of loads heavy and light as well with low height from bottom of vehicle to floor for wheel usage. It is the first wheel and roller assembly of its kind to match the weight load rating (tire load rating) of a conventional heavy truck class rating; example: a conventional rubber tire used for Interstate use, conventional road use, and off the road use, etc.

The wheel assembly is also highly resistant to acids, fuels such as gasoline, diesel fuel, other liquid fuels, and other chemicals; caustic alkali materials, caustic acids, sulfuric acids, hydrochloric acids, chemical solvents, etc. This is achieved through the use of Isoplast$^R$ grade 202 or Victrex Peek$^R$ material molded onto the wheel tread locking hub.

There is also an alternate use of the Isoplast$^R$ 202 and Victrex Peek$^R$ as an inner support liner located inside between the sidewalls and against the inner bottom of a conventional tire, either tubeless or conventional tube type for the automotive field. This will afford the conventional automotive tires puncture proof operation and extra capacity for safety on the sidewalls where blowouts can occur. The inner liner prevents this with tube type or without an inner tube for tubeless type automotive tires. The automotive rubber tire can either be mechanically fastened or molded around the Isoplast$^R$ or Victrex Peek$^R$ inner liner. This is the product for the future available today.

SUMMARY

The present invention offers many significant improvements over the prior art. Its primary purpose is to lock on rigid to soft engineering thermoplastic polyurethane materials that have little to moderate resilience and other wheel tread materials while providing an underlying support for the rolling load with ductility without weakening the contact areas where the locking circular groove contacts the wheel tread material and to bond difficult to bond engineering thermoplastic resins being somewhat harder and a lot stronger than conventional wheel tread materials. The wheel tread lock is designed to give the best tread locking possible with one or more locking circular grooves within the wheel hub outer circumference locking on and supporting the tread material (also known as the tire), around said wheel hub. The wheel hub can also be any larger wheel hub rim or pulley sheave in diameter width of wheel size, etc. This set up does not allow any rotation or movement of wheel tread either in the locking circular groove or around the wheel wub circumference. This concept enables the present invention to have the best mechanical advantage offering the greatest strength possible for a given size of wheel hub.

The present invention will supply the best bonding that can be achieved, by using a mathematically designed locking circular groove or grooves that are different from any of the previous prior art. Also with the use of newly invented manufacturing principles completely new and different from any used previously or in use today, along with precision and standardization of locking circular groove design, dimensions and performance between the wheel tread lock hub and the wheel tread molded and bonded to it. This bonding is achieved through the new invention of the tread locking circular groove. The new tread locking circular groove design offers this significant improvement over the prior art, achieved through machining the Wheel Hubs by using specially designed form cutting tools. These form cutting tools are used to construct a groove that matches the shape form of the tool for the locking circular grooves while controlling the dimensions with regard to the radii and the depth of the locking circular groove as well as the angle of the sides precisely to provide the specific ratios, for radius to depth for the locking circular groove mentioned here in this invention. Additionally, a one-part epoxy can be used to aid in the molding process for adhesion and sealing purposes between the wheel tread lock groove and the wheel tread material. This wheel tread material can be called "the tire" for description purposes herein.

CIP SUMMARY

The present invention offers many significant improvements over the prior art. It has a dual purpose to provide the best tread material possible with the best tread locking possible as well while making use of the maximum benefits from Isoplast$^R$ 202 and Victrex Peek$^R$ 450G when used as a tread or roller material and when used as matrixes creating unexpected results from the formed alloys supplying super additional strength. These benefits to be used for the current and future uses of Isoplast$^R$ 202 or Victrex Peek$^R$ 450G after alloying with C-60 or C-76 and other commercial carbon fibers to form the strongest wheel, roller and track tread possible, and to lock on these rigid as well as other softer more flexible engineering thermoplastic polyurethanes and other materials that have little to moderate resilience and other wheel tread or roller materials while providing an underlying support for the rolling load with ductility without weakening the contact areas. The present invention used an inner tube perforated liner surrounding an open locking circular groove located on the wheel hub or roller shaft either concentric or eccentric to the center of rotation of the wheel, or a roller shaft without an open groove, with the tread material located between the roller shaft outer circumference and the outer circumference of the inner tube perforated liner and to lock on difficult to bond engineering thermoplastic resins being somewhat harder and a lot stronger than conventional wheel tread materials. Also forming superior lubricants after further compounding with an oil base providing super lubrication for automotive and machine use.

The wheel tread lock of the present invention is designed to give the best tread or roller material,(a roller generally being somewhat smaller in diameter on a shaft solid or hollow) locking possible with one or more locking circular grooves within the wheel hub outer circumference supporting the inner tube perforated liner locked on to the circumferance by two external O.D. snap rings locking on and supporting the tread material (also known as the tire), around said wheel hub or in the case of the thinest shaft, hub, or tube wall without any circular groove if so desired. The wheel hub can also be any larger wheel hub rim or pulley sheave in diameter width of wheel size, etc. This set up does not allow any rotation or movement of wheel tread either in the locking circular groove or around the wheel hub circumference. This concept enables the present invention to have the best mechanical advantage offering the greatest strength possible for a given size of wheel hub.

Isoplast$^R$ 202 or the Victrex Peek$^R$ material can be used as an internal liner on conventional automotive tires producing a puncture proof tire sidewall and a tread area that is in contact with the road surface, by protecting and supporting the general shape of the rubber tire from punctures located in the inner tire inside cavity and between the adjacent sidewalls.

Isoplast$^{R\ 202}$ when alloyed with the pure carbon content C-60, C-76 and commercial carbon fibers will give excellent performance when compounded and then further compounded with a motor oil base.

BRIEF DESCRIPTION OF DRAWINGS

A Numerical Index:

For FIGS. 1–27

Figure 1:
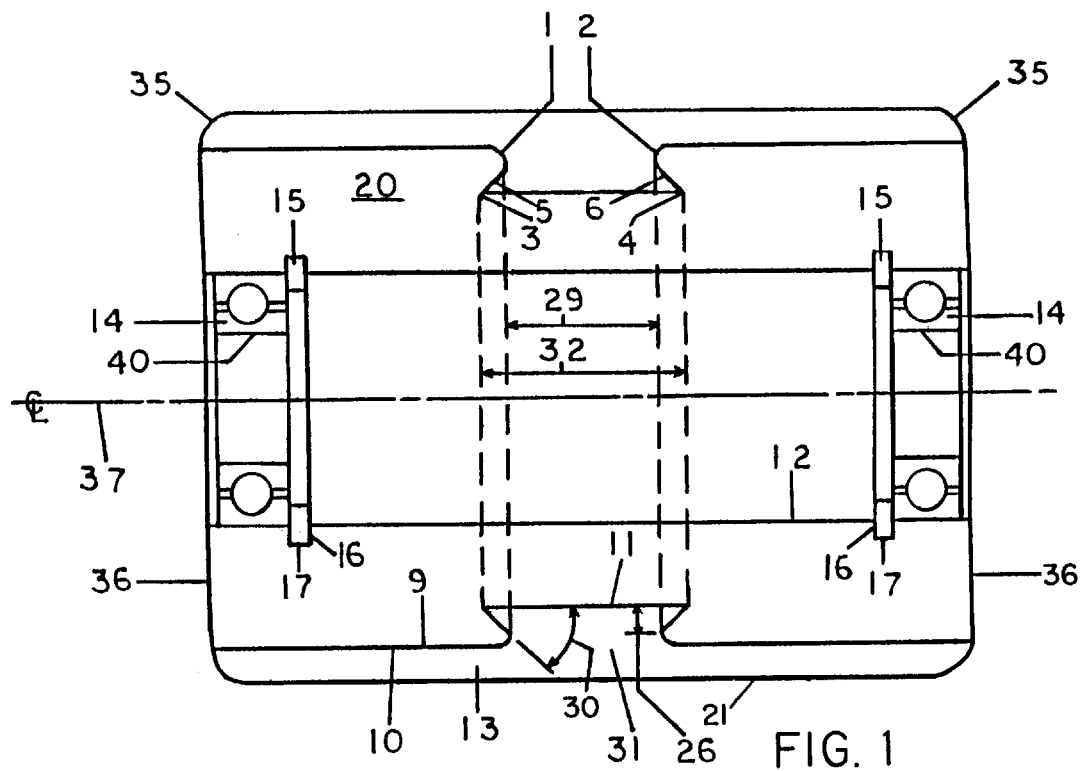

Nos. 1 and 2 are the radii points at the entrance of the tread locking circular groove between circumference 9 and internal circular inclined angled sides 5 and 6 respectively which run circumferentially around the wheel hub body 20.

Nos. 3 and 4 are the internal circular corners contacting the ends of the concave radius 7 or straight surface 11 in the tread locking circular groove.

Nos. 5 and 6 are the internal circular inclined angled sides for FIGS. 1–12, and the internal circular parallel sides for FIGS. 13–16 of the tread locking circular groove.

No. 7 is a concave radius in the bottom of the tread locking circular groove running continuously 360° around the center and axially between the internal circular corners 3 and 4 of the wheel hub body 20.

Nos. 8 are the channel grooves running axially either straight or on angles in the bottom of the tread locking circular groove that run continuously 360° around the center of the wheel hub body 20.

No. 9 is the outer circumference on the wheel hub body 20.

No. 10 is the inner surface of the wheel tread body 13 contacting the outer circumference 9 on the wheel hub body 20.

No. 11 is the straight surface in the bottom of the tread locking circular groove running continuously 360° around the center and axially between the internal circular corners 3 and 4 of the wheel hub body 20.

No. 12 is the internal wheel bearing bore running straight through the wheel hub body 20 axially and is always concentric to the outer circumference 9 of the wheel hub body 20.

No. 13 is the wheel tread material body.

Nos. 14 are the inner wheel bearings; ball, roller, tapered roller, etc. for the wheel hub assembly.

Nos. 15 are the internal snap rings for axial bearing positions.

Nos. 16 are the depth stops for internal snap rings Nos. 15.

Nos. 17 are the groove widths for the internal snap rings Nos. 15.

Nos. 18 and 19 are the protruding bulbs.

No. 20 is the wheel hub body.

No. 21 is the outer wheel tread surface contacting the ground.

No. 22 is the internal lubrication channel running axially through the internal bearing bore 12 between depth stops 16 and 16.

Nos. 23 and 24 are corners between the bulbs 18 and the side 5, and the bulb 19 and the side 6 respectively.

No. 25 is the epoxy adhesive.

No. 26 is the depth of the locking circular groove for the concentric locking circular grooves measured from the internal circular corners 3 or 4 to the outer circumference surface 9.

No. 27 is the depth from the center (deepest point) of the concave radius 7 to either of the internal circular corners 3 or 4.

No. 28 is the depth of the channels 8 in the locking circular groove to either of the internal circular corners 3 or 4.

No. 29 is the width of opening between radii points 1 and 2 of the locking circular groove.

No. 30 is the angle between the internal circular inclined angle sides 5 and 6 the maximum to width 32 of the locking circular groove between internal circular corners 3 and 4 respectively.

No. 31 is the locking circular groove area.

No. 32 is the maximum width of the locking circular groove containing concave radius 7 or straight surface 11 between the internal circular corners 3 and 4.

No. 33 is the minor depth of the eccentric locking circular groove or grooves.

No. 34 is the major depth of the eccentric locking circular groove or grooves.

No. 35 is the outer tread material radius of the tread material 13 located where the outer wheel tread surface 21 contacts the side ends 36 on either side of the wheel hub body 20 and running circumferentially.

No. 36 is a side end of the wheel hub body 20.

No. 37 is the centerline axis of the bearing bore 12.

No. 38 is the centerline of the eccentric locking groove, that is offset from the centerline 37.

No. 39 is the amount of measured offset between centerline axis of rotation 37 and centerline of eccentric locking groove 38.

No. 40 is the inner race bore of the wheel bearing 14 used in bearing bore 12.

No. 41 connecting point of side wall to road tread surface 49.

No. 42 side wall surface area.

No. 43 tire inflation valve.

No. 44 support wheel rim for tire.

No. 45 contact surface area to road outer circumference.

No. 46 outer tire tread groove design.

No. 47 inner tire area for wheel bearings for rotation.

No. 48 connection point of tire side wall to wheel 44.

No. 49 inner tire tread surface area of balloon tire.

No. 50 concentric centerline axis of rotation of balloon tire.

No. 51 is the width of channels 8.

No. 52 angle of offset of channels 8 from centerline axis 37.

No. 53 is the outer radius of locking ring 66.

No. 54 is the inner bore of inner tube liner 60.

No. 55 is the outer periphery of inner tube liner 60.

No 56 is an inner rubber inflatable automotive tube inflated through valve 43.

No. 57 is the pneumatic automotive tire.

No. 58 is an axle flange.

No. 59 is a typical mounting lug nut for securing automotive wheel assembly to axle flange 58.

No. 60 is the inner tube perforated liner.

No. 61 is a support flange bushing for the inner tube perforated liner 60.

No. 62 is an outer O.D. snap ring used to hold the support flange bushing 61 in place.

No. 63 is the depth stop for the O.D. snap ring 62.

No. 64 is the bottom O.D. snap ring groove depth for snap ring 62.

No. 65 is an inner hole opening used in the inner tube liner 60 and in the circumferencial locking ring 66 for entry of the molded on tread 13.

No. 66 is an outer circumferencial locking ring.

No. 67 is the inner radius wall of circumferencial locking ring 66.

No. 68 is an exhaust port relief opening for removal of trapped gas and flow of molded tread 13 during molding.

No. 69 is the connection portion of the outer circumferential locking ring 66.

No. 70 is an inner tire liner.

No. 71 is a dovetail securing groove for locking on rubber tire 57.

No. 72 is the outer area circumference contacting the inner area circumference of pneumatic tire 57.

No. 73 is the hollow cavity area for inner inflation tube 56.

No. 74 is the inner tire liner contact to tire sidewall connection point 42.

No. 75 is an inner support shaft for rotation and mounting of roller tread 76 in the roller assembly.

No. 76 is the roller tread.

No. 77 is a side tread stop.

No. 78 is the outer roller tread surface area.

No. 79 is the outer circumferencial locking groove in contact with the roller tread 76.

No. 80 is the tread of the track tread cleat assembly.

No. 81 is the mounting plate for 80.

No. 82 is the track tread outer surface for road connection.

No. 83 is a bolt hole for mounting.

No. 84 is the track tread mounting plate to track tread connection point.

No. 85 is a perforated section material mounting bolt.

FIGS. 1–27 are shown in cross sectional view with the tread material thickness dimensions for Isoplast shown in approximate actual size FIG. 1 shows basic locking circular groove being concentric to internal wheel bearing bore 12.

Figure 2:
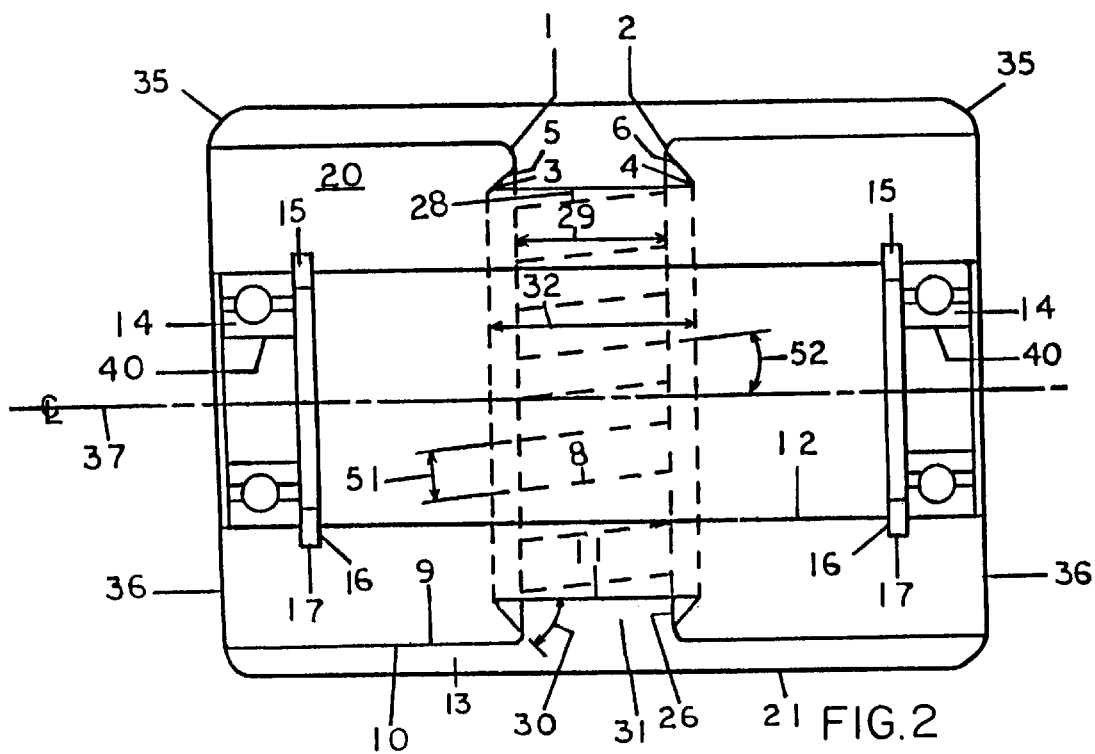

FIG. 2 shows locking circular groove of FIG. 1 with internal channels 8 also concentric to internal wheel bearing bore 12.

FIG. 3 shows locking circular groove being eccentric to internal wheel bearing bore 12 without channels 8 in locking circular groove.

FIG. 4 shows FIG. 3 with channels 8 in locking circular groove eccentric to internal wheel bearing bore 12.

Figure 5:
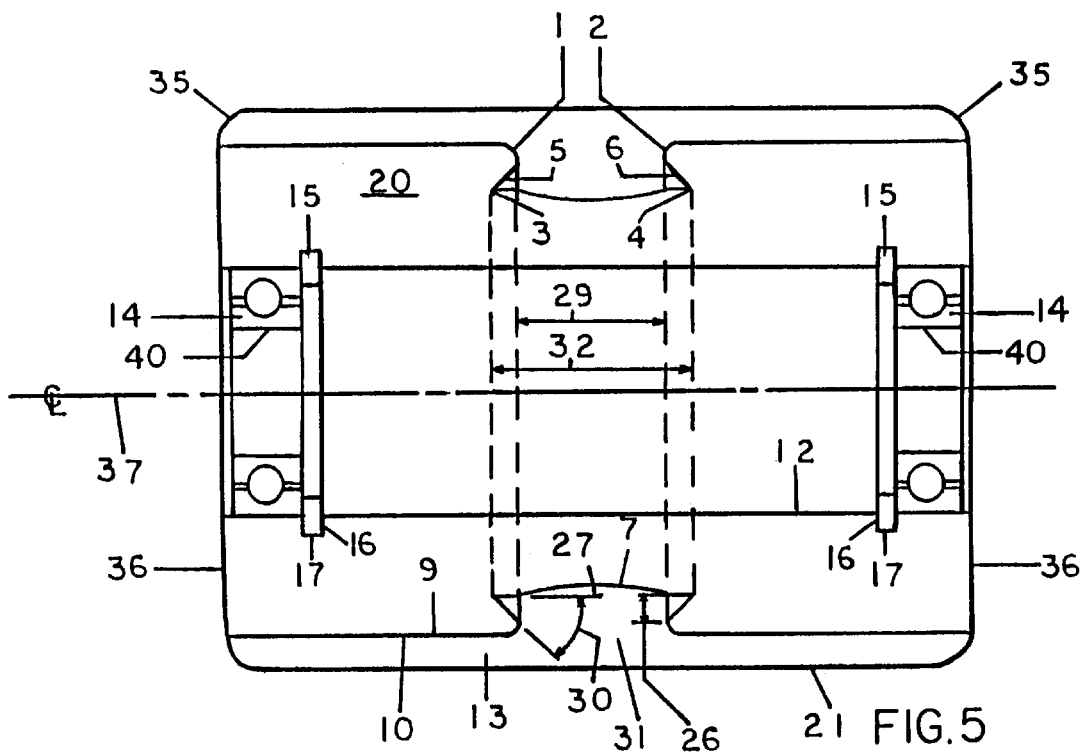

FIG. 5 shows locking circular groove being concentric to internal wheel bearing bore 12 with concave radius 7 in bottom of locking circular groove.

Figure 6:
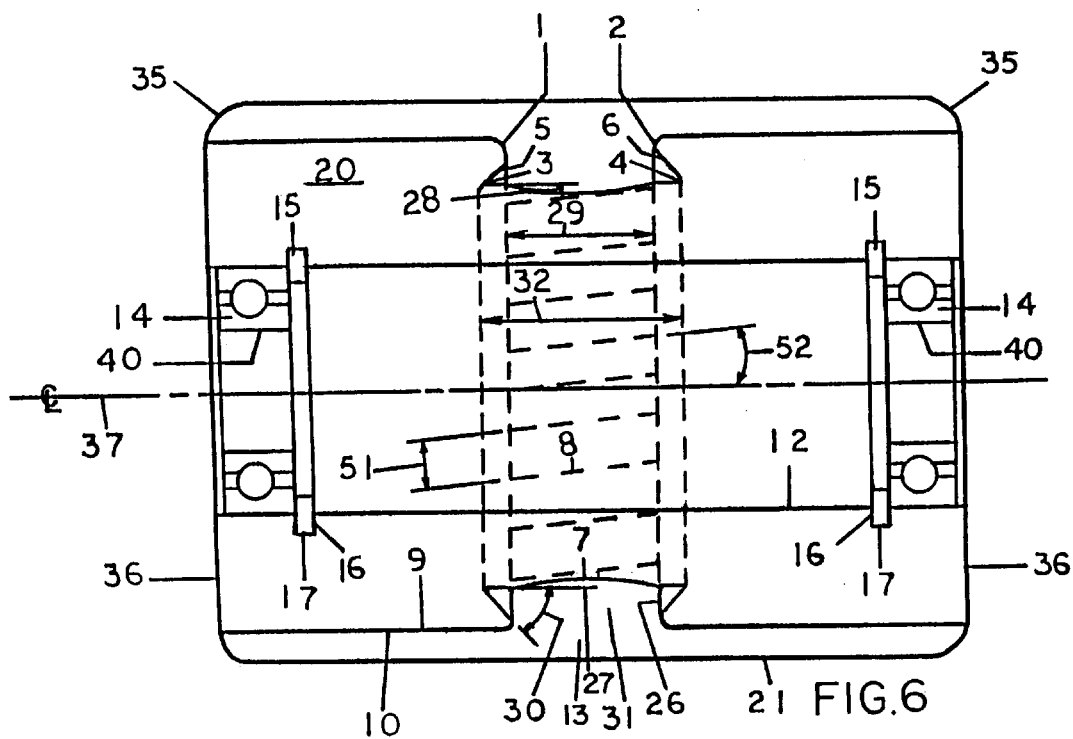

FIG. 6 shows locking circular set up of FIG. 5 with addition of channels 8 in locking circular groove being concentric to internal wheel bearing bore 12.

Figure 7:
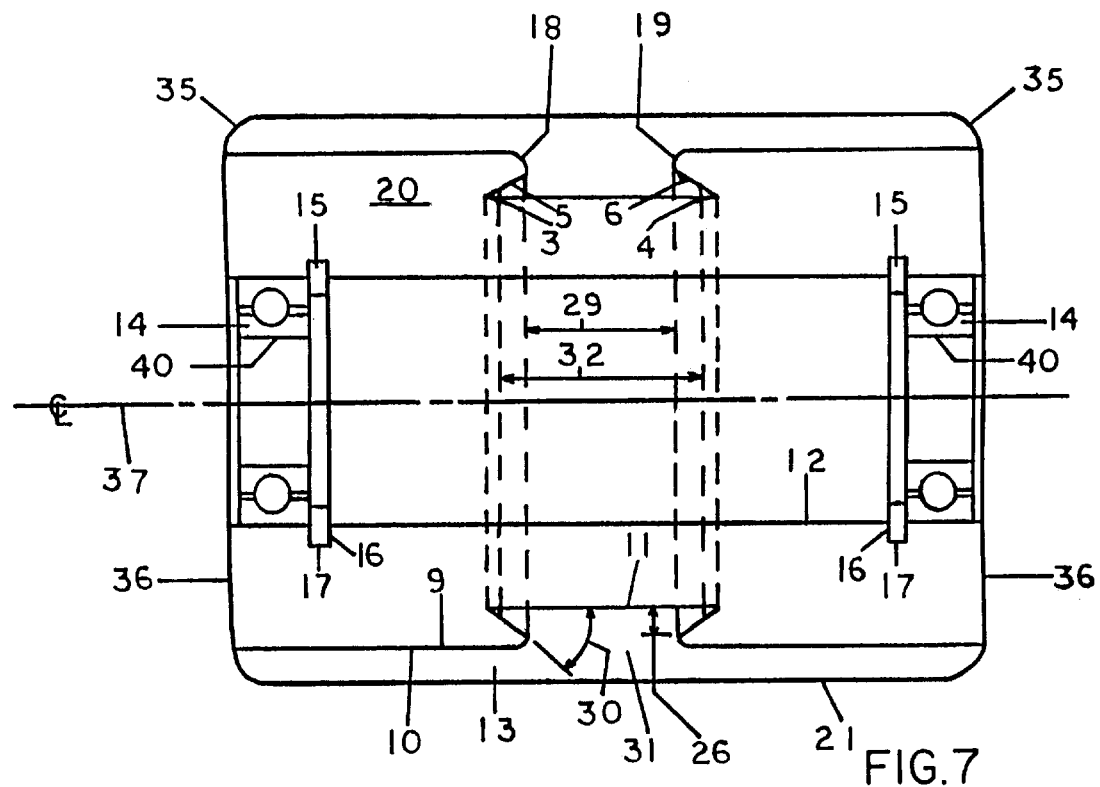

FIG. 7 shows FIG. 1 with protruding bulbs 18 and 19 with locking circular groove being concentric to internal wheel bearing bore 12.

Figure 8:
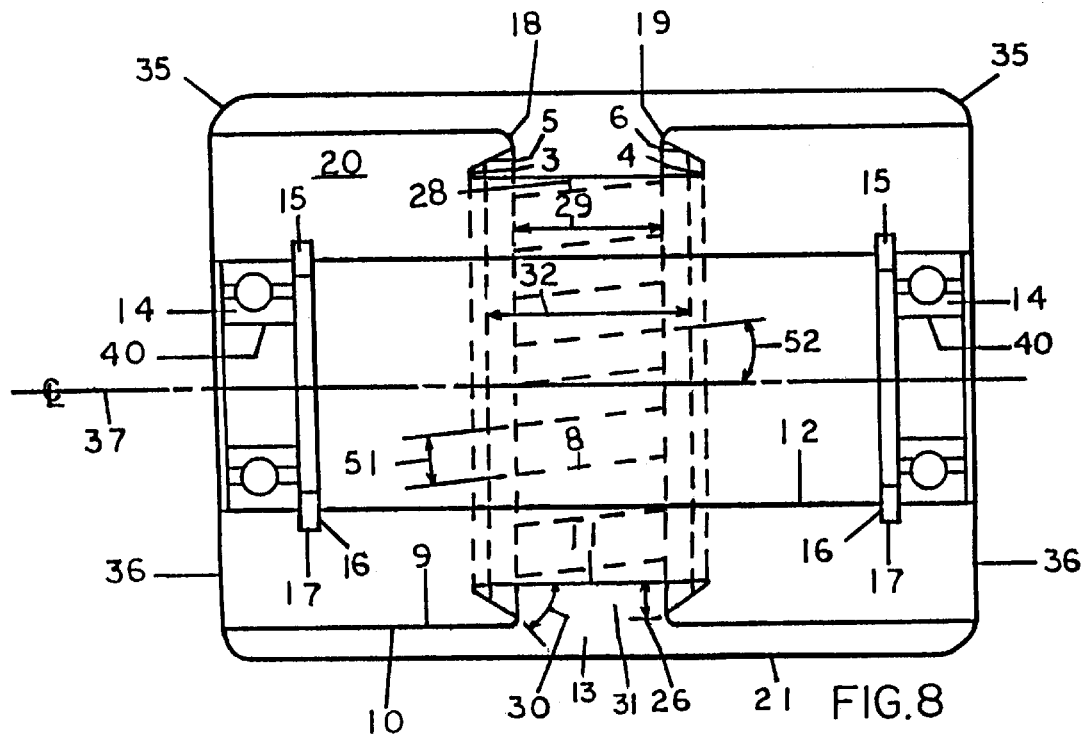

FIG. 8 shows FIG. 7 with locking circular groove, with addition of channels 8 in locking circular groove being concentric to internal wheel bearing bore 12.

Figure 9:
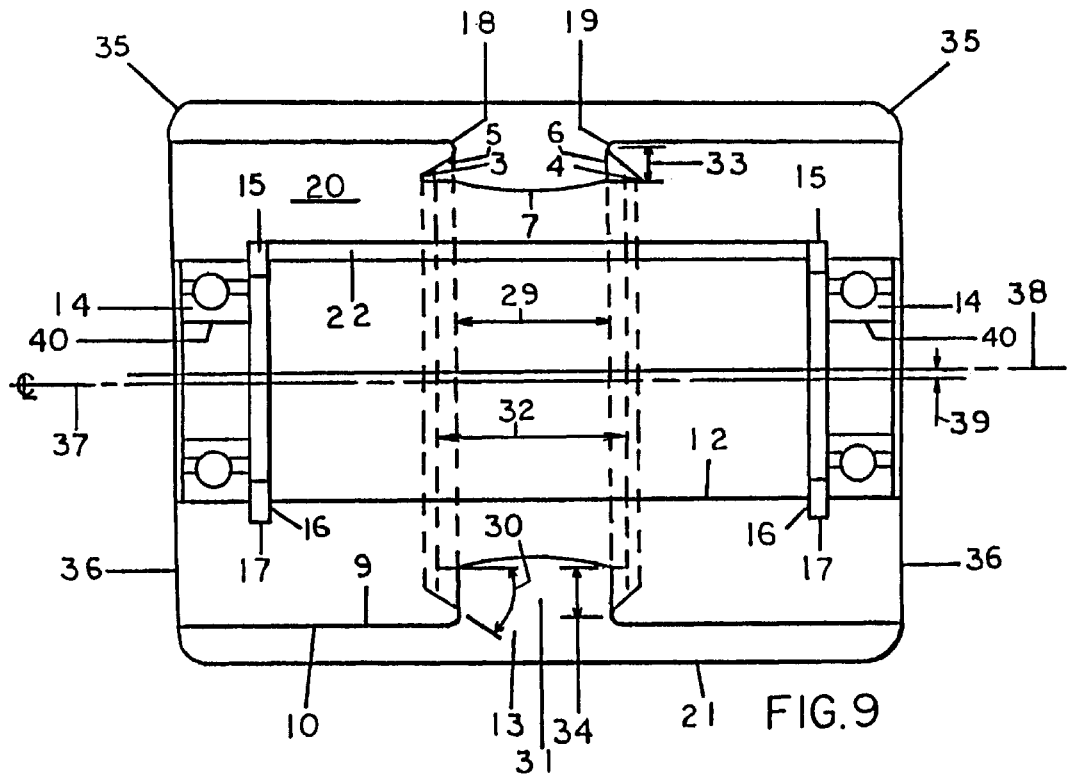

FIG. 9 shows FIG. 3 with addition of protruding bulbs 18 and 19, with locking circular groove being eccentric to internal wheel bearing bore 12.

Figure 10:
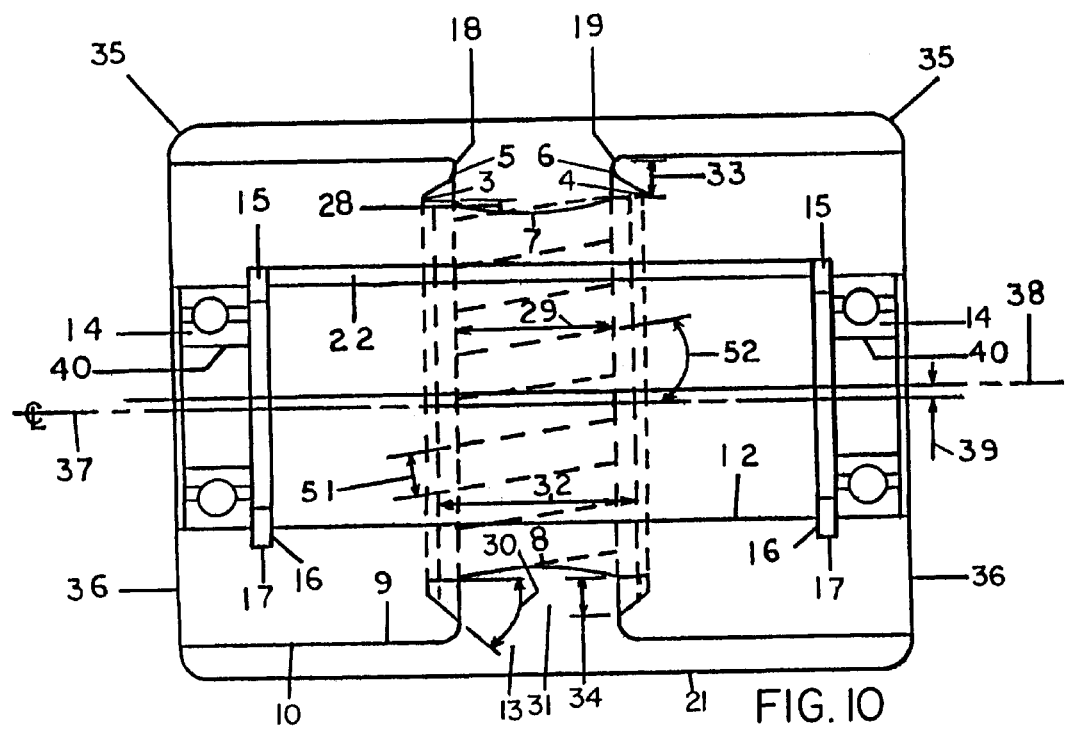

FIG. 10 shows FIG. 9 with addition of channels 8, with locking circular groove being eccentric to internal wheel bearing bore 12.

Figure 11:
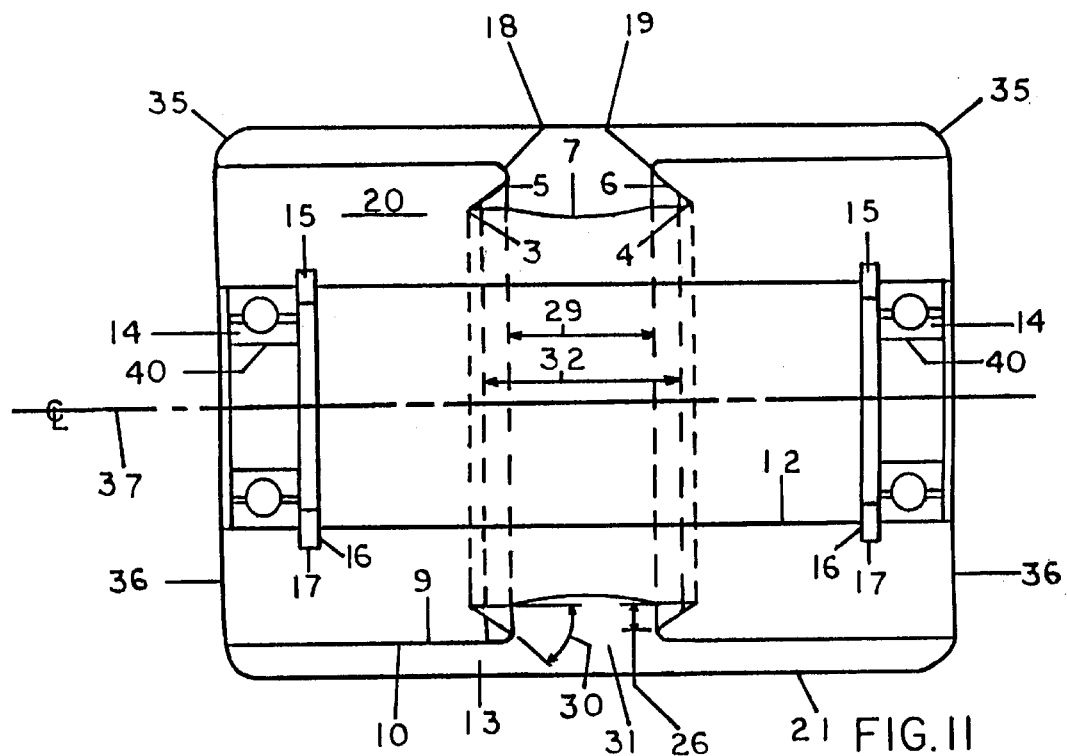

FIG. 11 shows FIG. 5 with addition of protruding bulbs 18 and 19 with locking circular groove being concentric to internal bearing bore 12.

Figure 12:
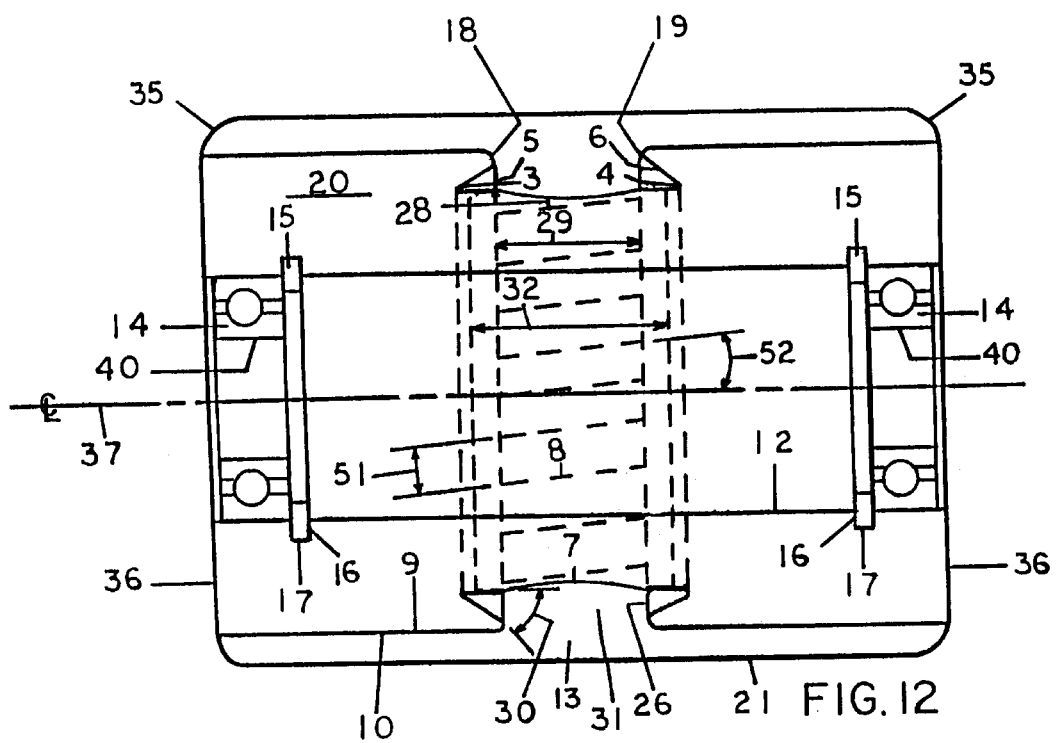

FIG. 12 shows FIG. 11 with addition of channels 8, with locking circular groove being concentric to internal wheel bearing bore 12.

Figure 13:
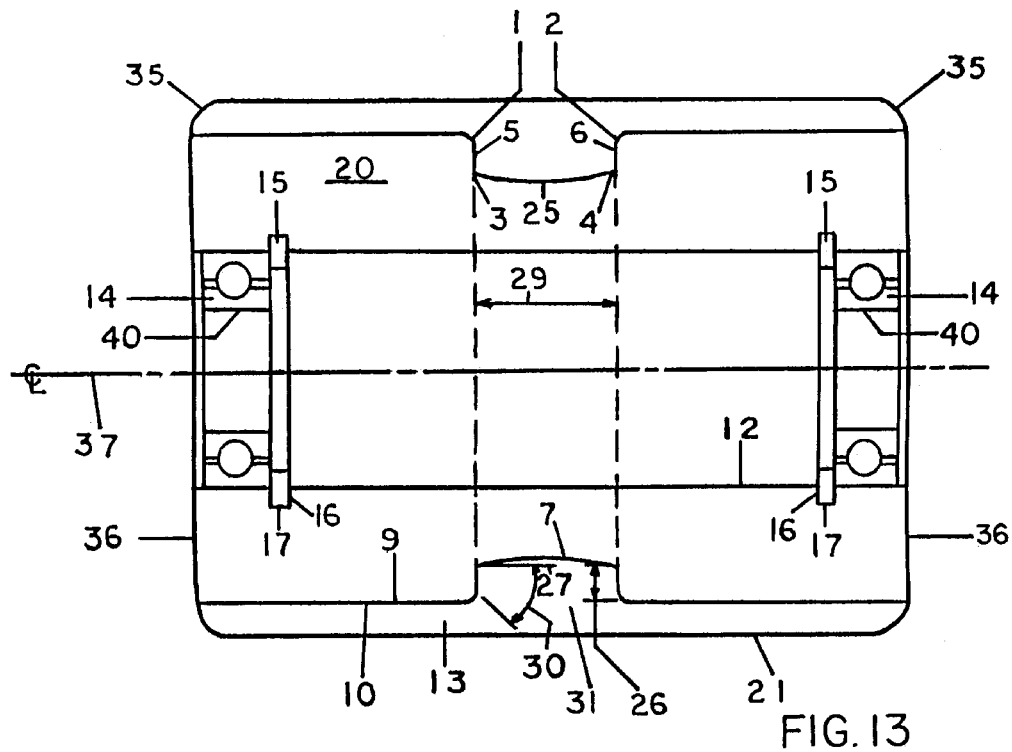

FIG. 13 shows a locking circular groove with sides 5 and 6 being parallel and at 900 to the concave radius 7 running axially, with the locking circular groove being concentric to internal wheel bearing bore 12.

Figure 14:
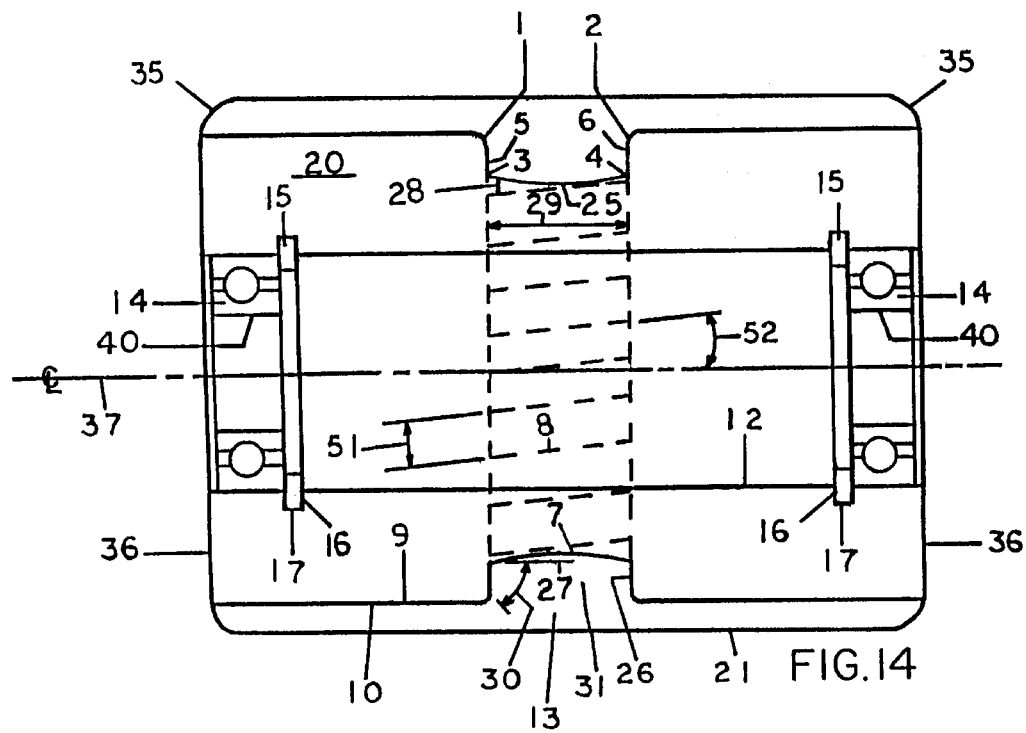

FIG. 14 shows FIG. 13 with addition of channels 8 and the locking circular groove being concentric to internal wheel bearing bore 12.

Figure 15:
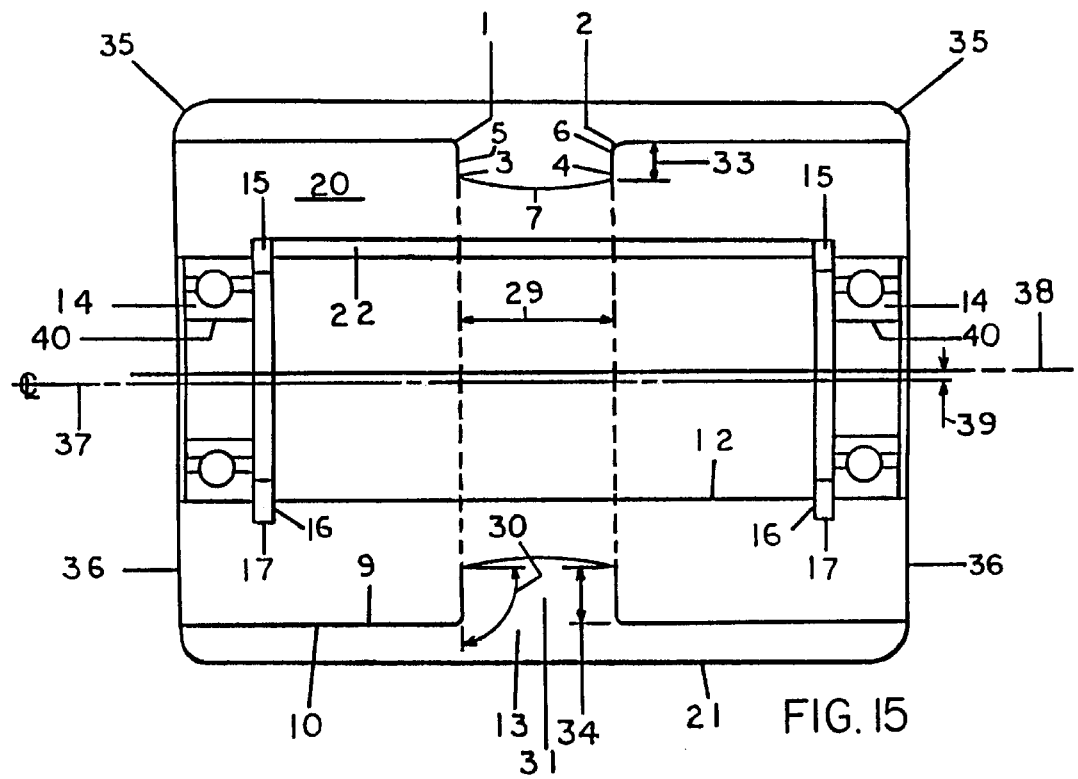

FIG. 15 shows FIG. 13 with the locking circular groove having sides 5 and 6 being parallel and at 90° to the concave radius 7 running axially and the locking circular groove being eccentric to internal wheel bearing bore 12.

Figure 16:
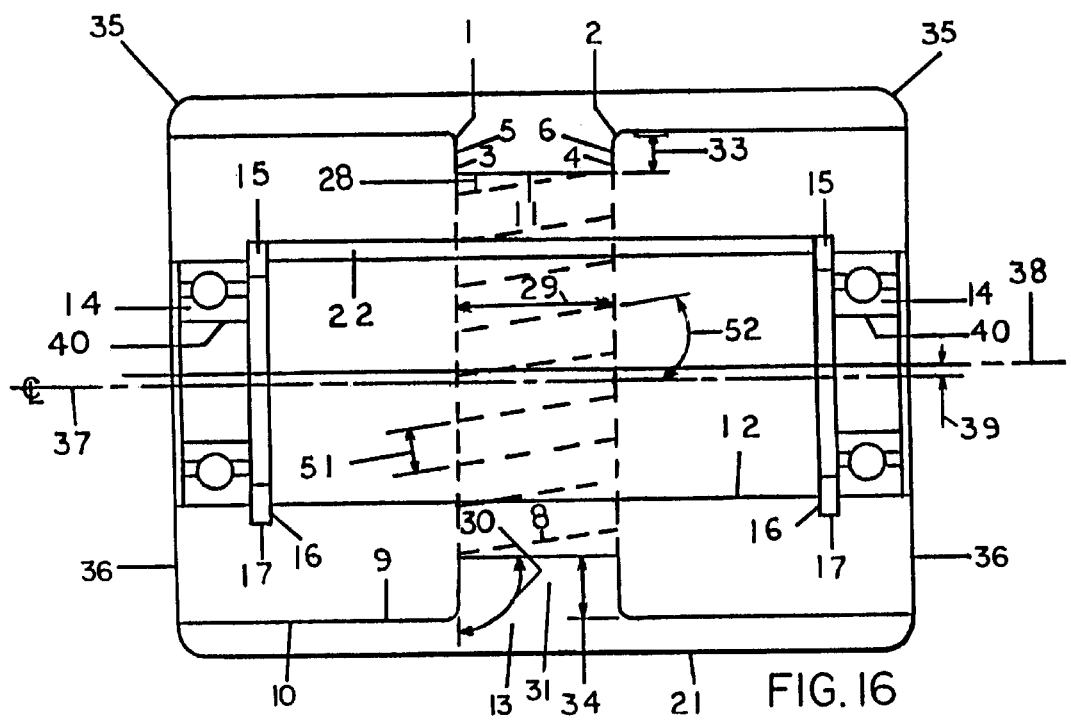

FIG. 16 shows FIG. 15 with addition of channels 8 and the locking circular groove being eccentric to internal wheel bearing bore 12.

Figure 17:
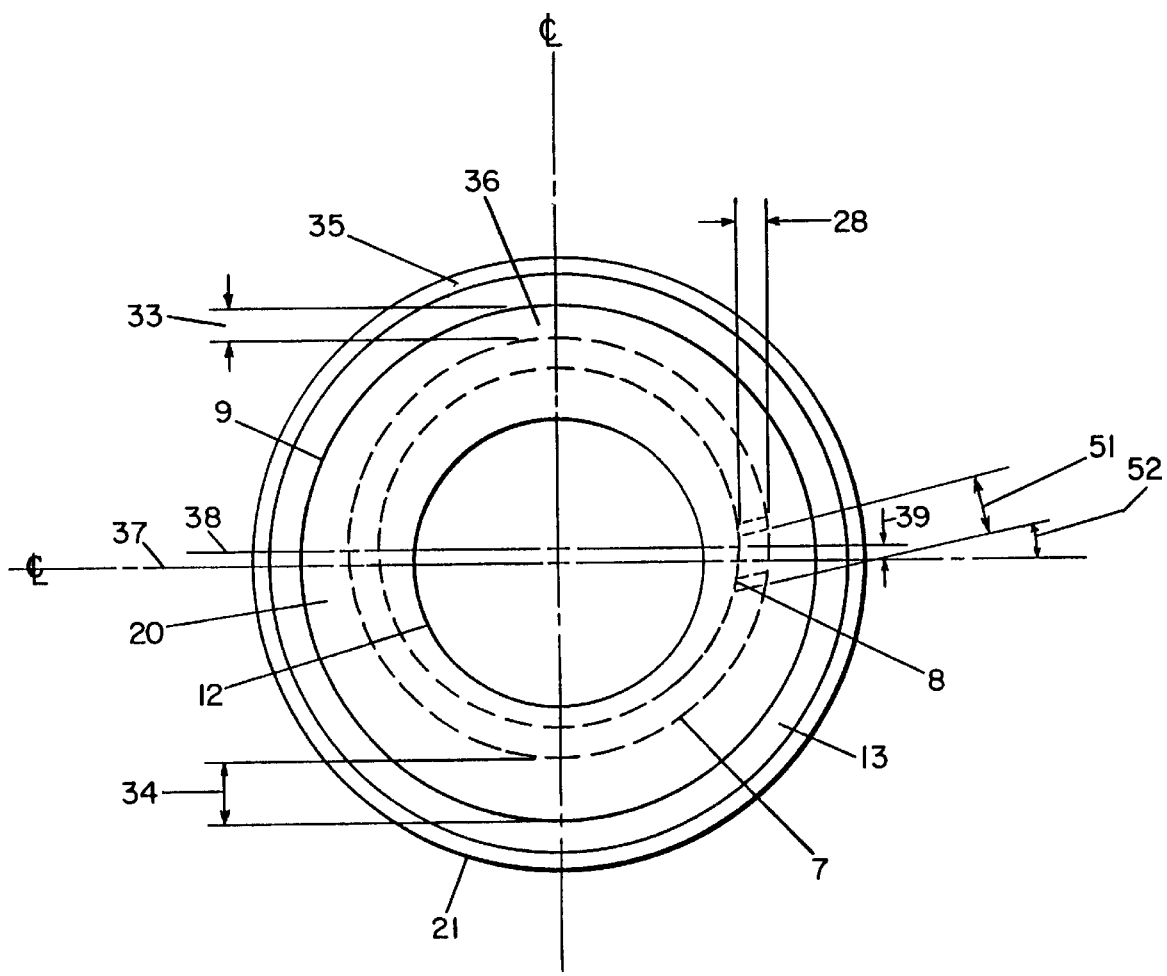

FIG. 17 shows cross section of FIG. 10 showing channels 8, and shows wedging action between tread 13 and bottom of locking circular groove 7.

Figure 18:
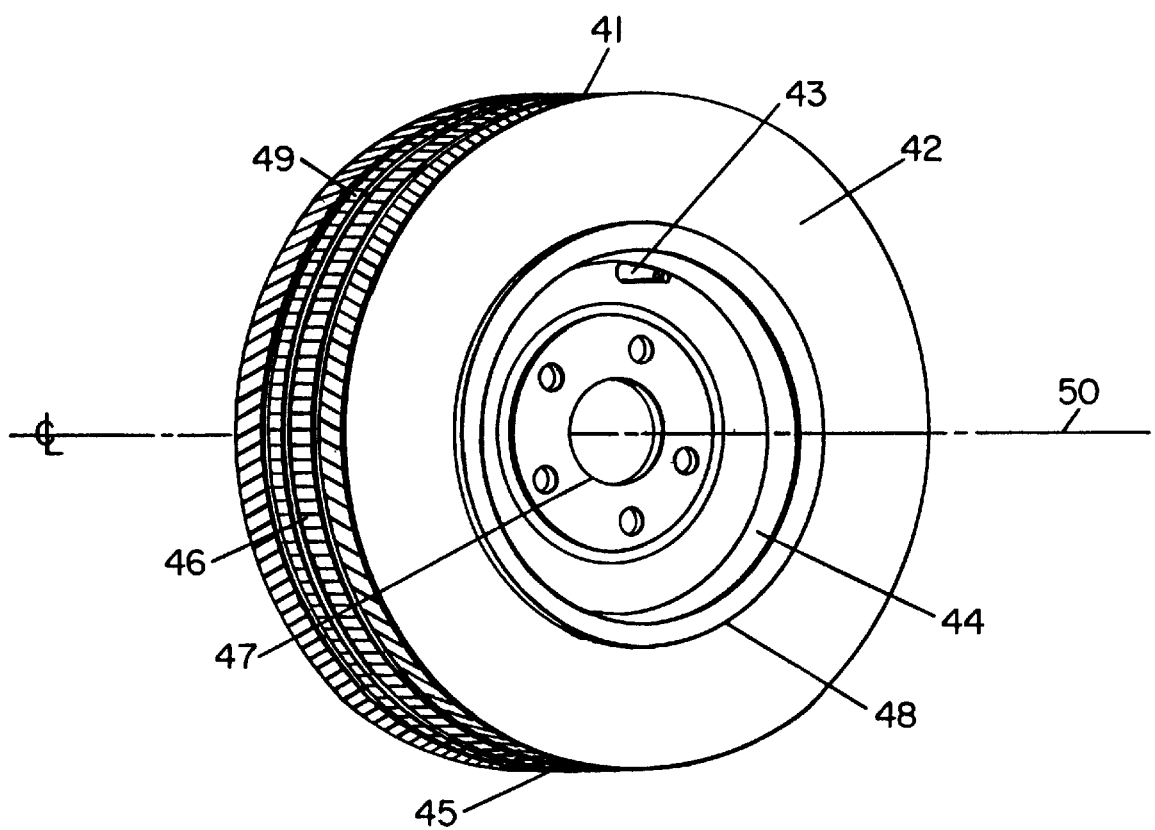

FIG. 18 shows a pneumatic tire with its inner circumferential cavity being hollow.

Figure 19:
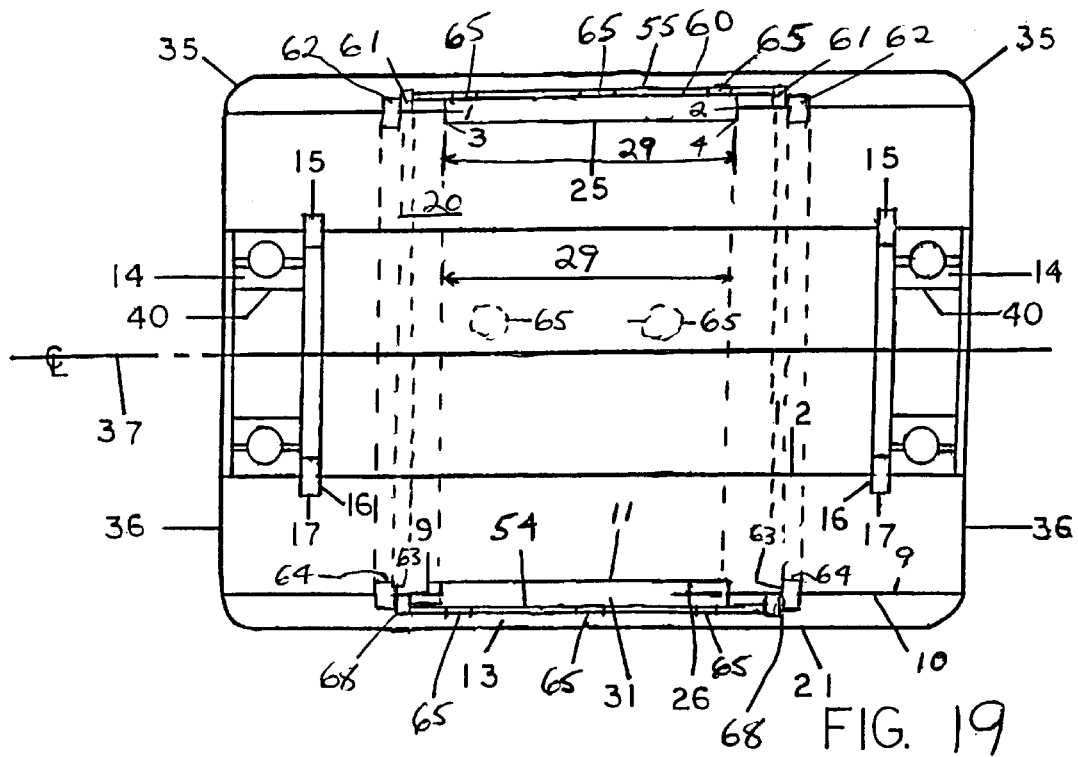

FIG. 19 shows a wheel similar to FIG. 13 from the previous invention with the addition of a perforated tube liner surrounding the O.D. circumferance over a locking open circular groove of the wheel hub positioned and supported by two flange bushings located either end of the perforated tube liner respectively, locked in place by two external O.D. snap rings with the locking circular groove being concentric to the center axis of rotation.

Figure 20:
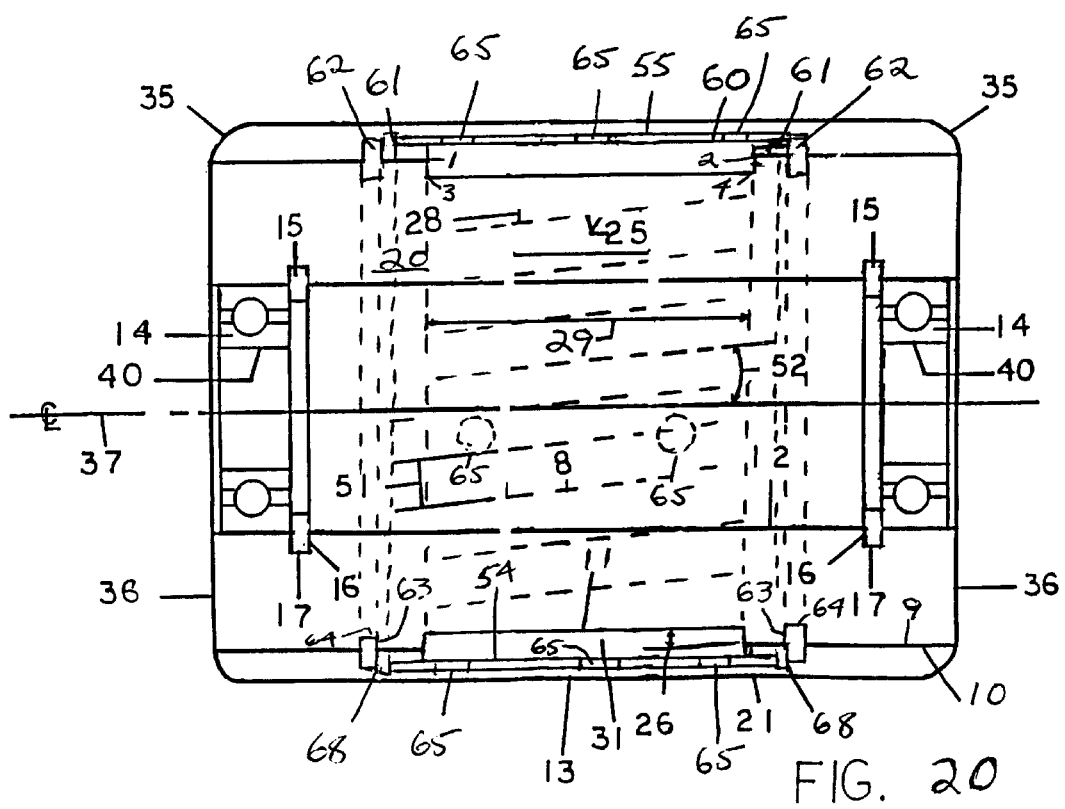

FIG. 20 shows the same tread locking features as FIG. 19 with additional channels as shown in FIG. 14.

Figure 21:
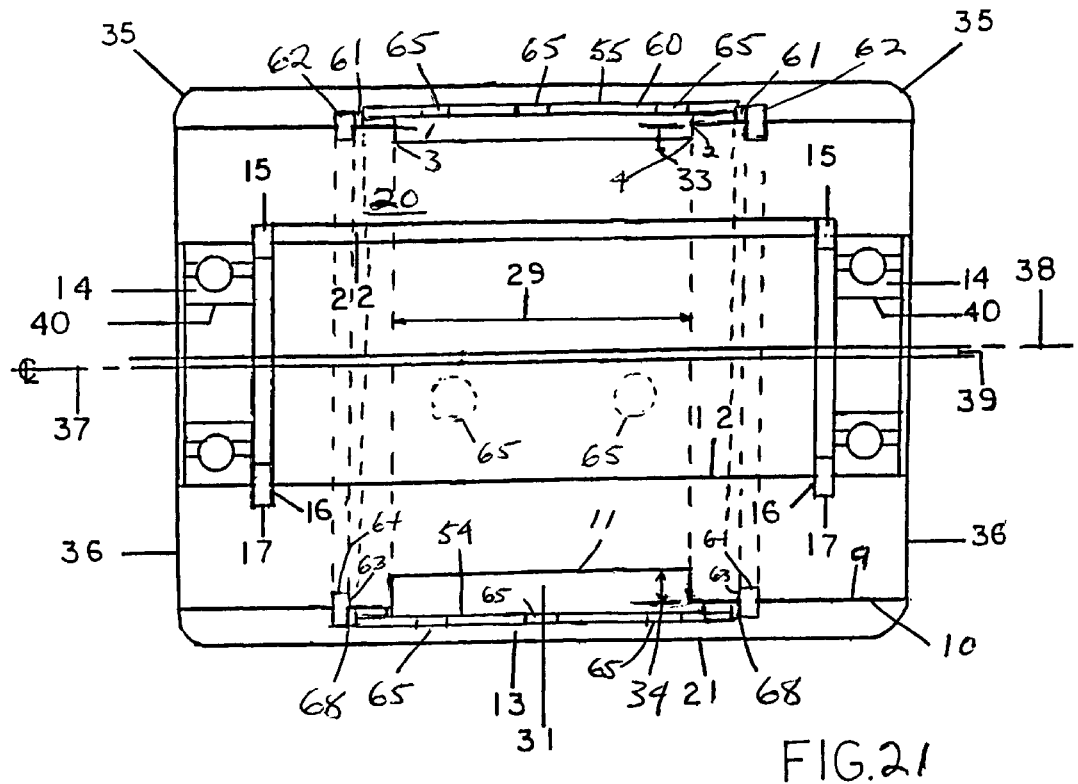

FIG. 21 shows the same tread locking features as the wheel of FIG. 19 except its locking circular groove is eccentric to the center axis of rotation instead of being concentric to the center axis of rotation.

Figure 22:
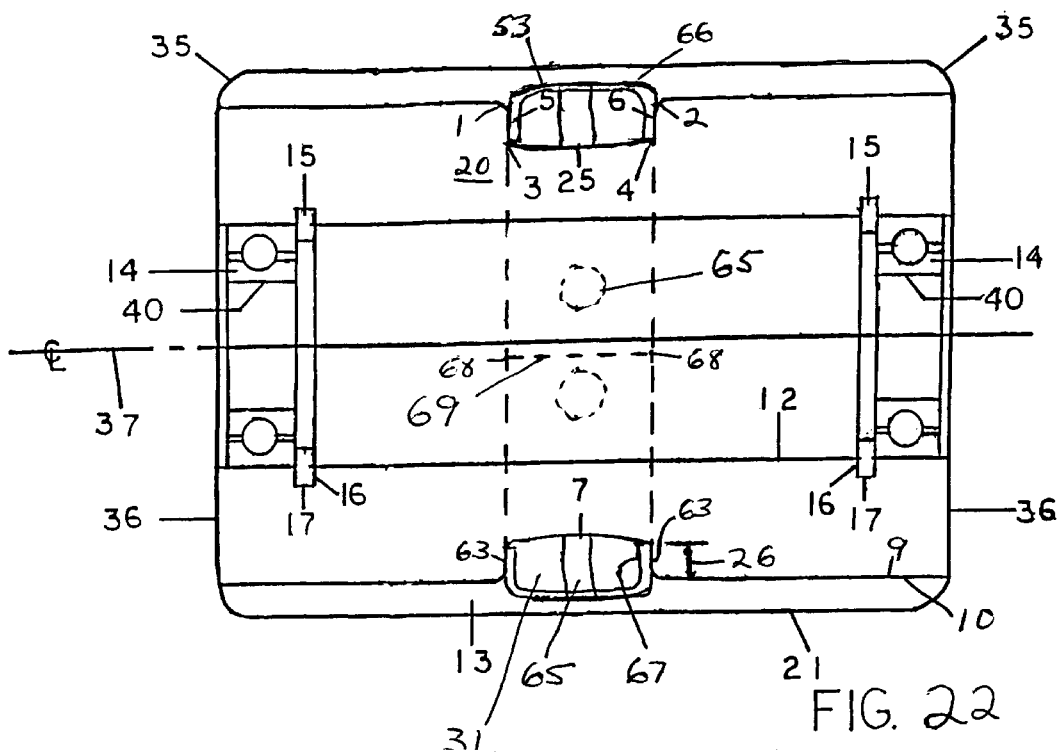

FIG. 22 shows a wheel similar to FIG. 19 with a locking circular ring situated in the open locking circular groove being concentric to the center axis of rotation.

Figure 23:
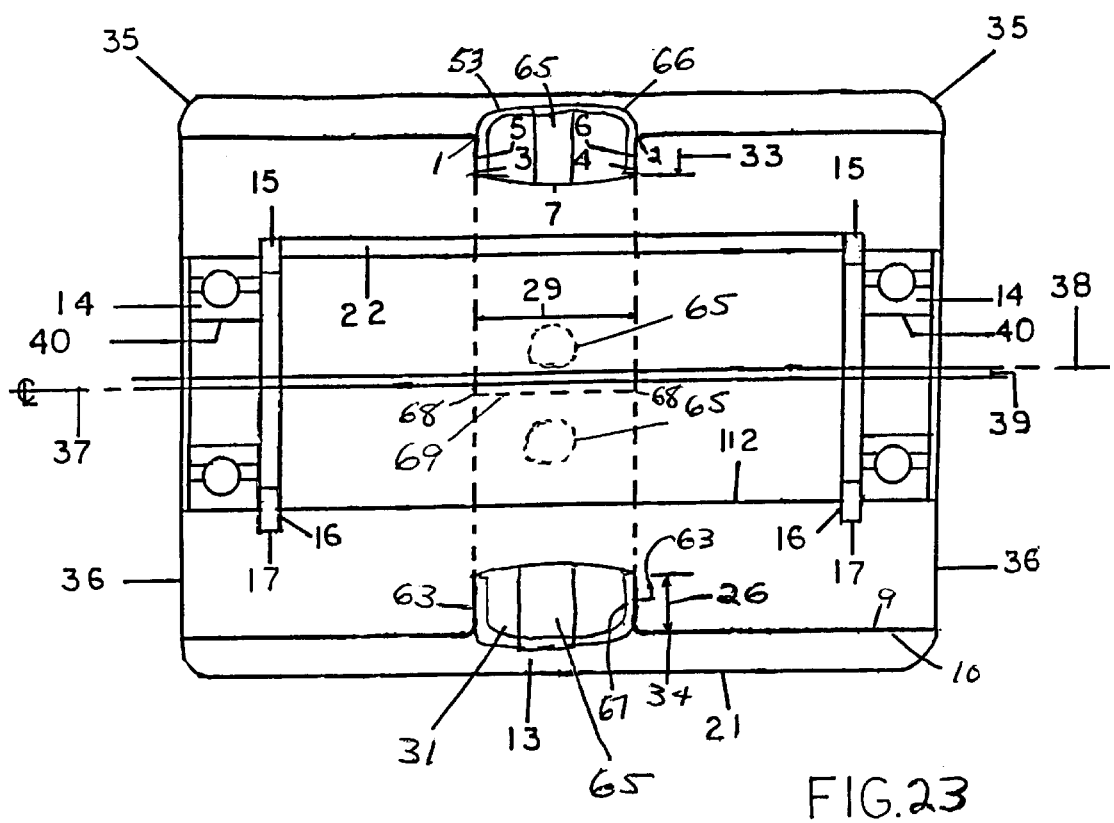

FIG. 23 shows the wheel of FIG. 22 with its outer locking circular groove and its locking ring being eccentric to the center axis of rotation.

Figure 24:
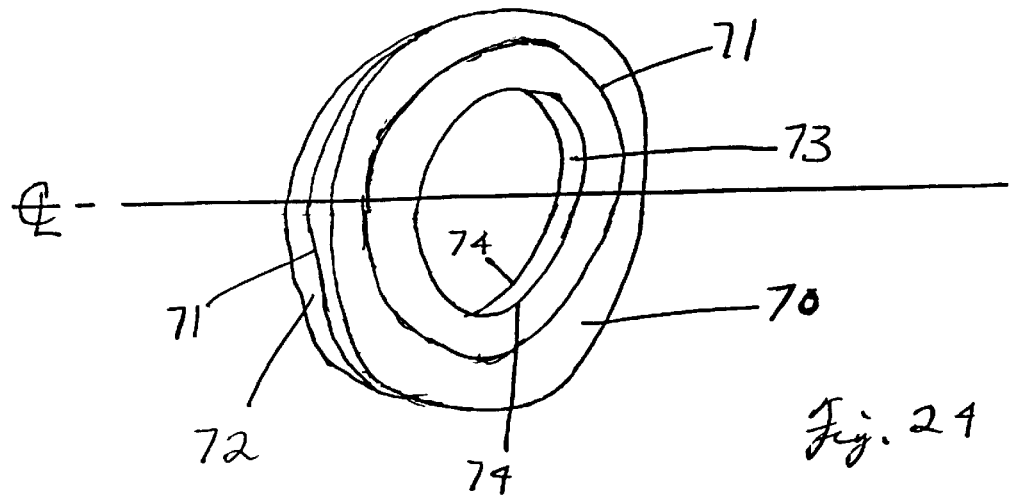

FIG. 24 shows the inner tire liner used inside of a typical automotive tire.

Figure 25:
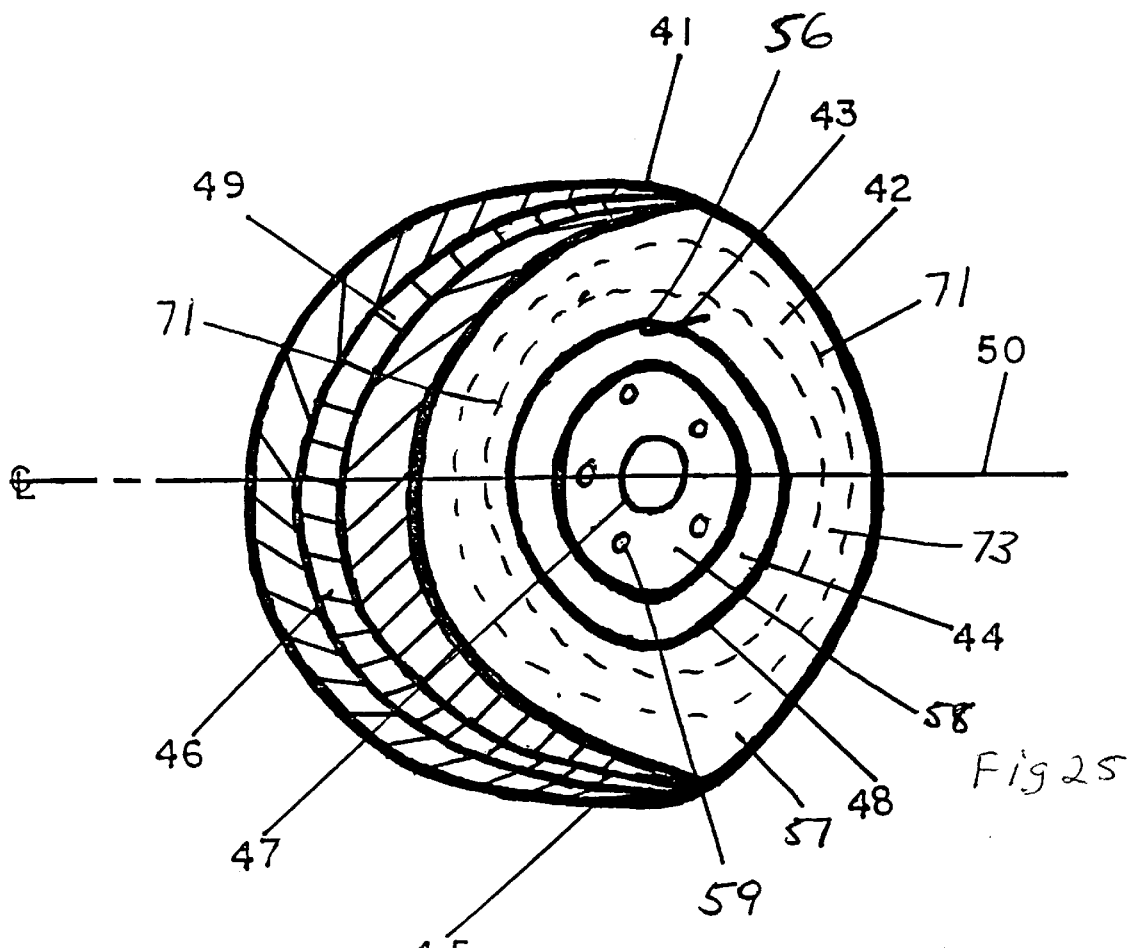

FIG. 25 shows the inner tire liner mounted in a typical automotive tire.

Figure 26:
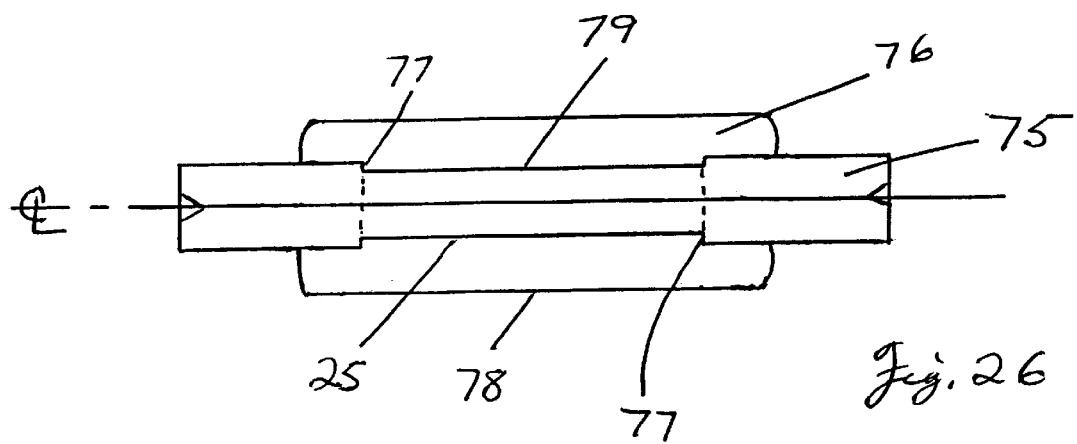

FIG. 26 shows a typical roller and shaft assembly.

Figure 27:
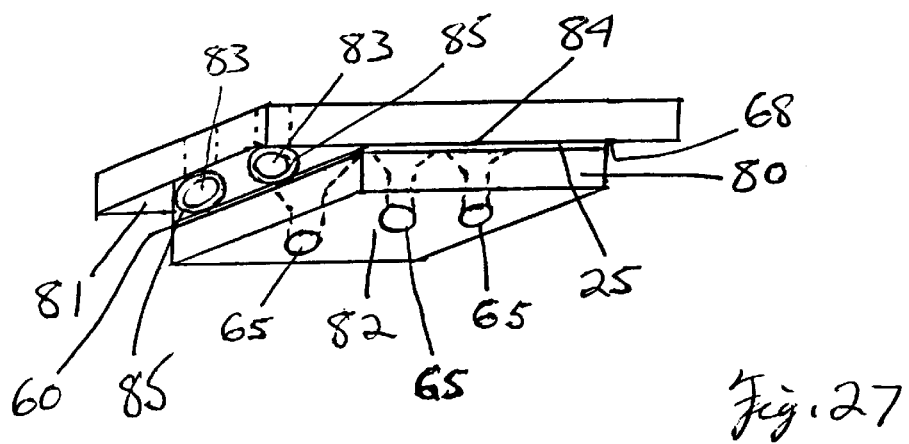

FIG. 27 shows a track tread cleat mounted on a track tread mounting plate.

DESCRIPTION OF EMBODIMENT

This invention is designed to supply bonding between extremely difficult to bond materials, such as Isoplast$^R$ grade 202, a rigid polyurethane, an amorphous resin with crystalline properties having a load rating of at least ten times that of the best domestic or foreign made material overseas. The tensile strength load rating of Isoplast$^R$ 202 is 9,000 pounds per square inch with a compression load rating of 11,500 per square inch. The tensile strength load rating of the best domestic or foreign made material is from 800 to 900 pounds per square inch with compression load rating of about 900 pounds per square inch. An alternate material such as Victrex Peek$^R$ 450G has tensile and compression ratings of about 50% higher than Isoplast$^R$ 202 as well as non-bondable materials with a wheel hub body designated as 20. Isoplast$^R$ grade 202 is an impact modified engineering resin that is highly resistant to acids and chemicals. The wheel hub body 20 is made of metal although it can be made of any other suitable rigid material, e.g., metal tubing, metal castings, that can have the locking circular grooves cast into the wheel hub body 20 with concave radii 7, internal locking channels 8, etc., described further on as well as non metallic materials that are capable of supporting a load either for dynamic or static conditions.

This bonding is achieved with the wheel tread lock groove taking advantage of the shallow depth from wheel hub outer diameter to bottom of wheel tread locking groove. The wheel tread lock groove is also known as the locking circular groove. FIGS. 1–16 show one locking circular groove on each wheel hub 20. In the making of wheel hub body 20, it is made with a number of locking circular grooves in proportion to its width to take advantage of maximum retaining force as well as providing maximum support for the wheel tread 13 while in rotation and under load use conditions. The following locking circular grooves shown and described herein for FIGS. 1 through 16 are made with special form cutting tools on conventional lathes and other standard machine shop machinery using conventional machine practices, and other related various industrial practices. This is necessary to have the locking circular grooves match the shape of the form tool and to achieve the specific ratio for outer opening width of the locking circular groove 29 to the total of dovetail depth 26 plus depth of concave radius 7 to be 1 to 1 to 8 to 1. The actual ratio may be dictated by the hardness and tensile strength of the tread material 13. The ratio is chosen to give the best bonding or retaining force for the selected tread material 13. The ratio for radii 1 and 2 to depth 26 which is about 4 to 1 to about 8 to 1 for concentric locking circular grooves or 33 and 34 for eccentric locking circular grooves.

The wheel hub 20 contains various wheel bearings 14 and 14, which consists of a straight through precision bearing bore 12 bored through in one operation from one side to the other producing the most accurate product.

A distance in from one end through to cover the width of the wheel bearing 14 plus a clearance with a true-arc snap ring 15 in an internal counterbore called a snap ring groove 16 will provide for a bearing stop and placement of the wheel bearing 14. The distance in for placement can be equal for both wheel bearings 14 and 14 that are pressed in each end of the bearing bore 12, for various loads and running conditions. No. 40 is the inner race bore of the wheel bearing 14 where a typical axle shaft is used to support the wheel for rotation and load use. The present invention has many applications. The materials designated as 13, to be bonded, can range from engineering thermo plastic resins as well as other thermo plastic resins and plastics to a wide range of metals. The axis of the circumference (outer diameter) 9 is always in the same plane as the axis of rotation being concentric at all times as well as to the internal wheel bearing axis. The axis of the locking circular groove is in the same plane with the axis of the wheel hub center which is also the center for the wheel bearings 14 and 14 in this wheel tread lock wheel assembly. The bottom surface portion of the locking circular groove being straight across from the adjacent sides 5 and 6 is designated as 11. The bottom surface portion of the Locking Circular Groove having the concave radius between adjacent sides 5 and 6 is designated as 7.

Channels 8 can also be used in the bottom of the locking circular groove or grooves 7 or 11 between the adjacent sides 5 and 6 to offer a third access lock. These locking sides 5 and 6 are normally straight but could be slightly concave to the locking circular groove or Grooves, if preferred. Also, the axis of the locking circular groove can be offset from the axis of the wheel hub containing the inner bearings' center. This offset now creates an eccentric between the locking circular groove and the inner wheel bearings. This eccentric can also be used as a balancing device to offset any internal channel or channels 22, positioned between the wheel bearings 14 that are used for lubrication to lubricate these wheel bearings which are in the internal bearing bore. The internal channel 22 is positioned 1800 opposite the major depth of the eccentric in the locking circular groove located on the wheel hub.

In the prior art wheels are made by pressing or molding the tire or tread into recesses in the hub or rim and locking by the use of cement and by curing in contact with the hub or rim by placing rigid elements or braces within the tread material. Heating elements are used to mold tread material in a circular groove in J. A. Swinehart's patent.

The engineering thermoplastic polyurethane designated as Isoplast$^R$ 202 for tread material 13 of my invention is molded around the wheel hub body 20 by various injection molding methods; e.g., injection molding. The injection molding process for molding the wheel tread 13 for Isoplast$^R$ or Victrex Peek$^R$ consists of using a horizontal or vertical molding machine with properly dried and heated engineering resin from a desiccant drier inserted in the molding machine hopper with the barrel feeder heated to high heat then injected into a wheel mold where there is a wheel hub 20 (insert) that is placed in the center over the ejection ram, then the cover is closed by the injection molding machine. Next, the Isoplast$^R$ or Victrex Peek materials are injected in through the cover through the sprue bushing and forced through the gating by pressure, then around the wheel hub (insert) and then allowed to cool to a set temperature or a preheated low mold temperature if desired. Then the molding machine opens with the cover attached and the ejection ram pushes against the bearing placement snap ring 15 and out comes the finished molded wheel tread 13 on the wheel humb 20 now called a wheel product. Color concentrate containing carbon or other additives can be added for color with improved abrasion resistance that is needed in wheel tread material 13 for load wheels, etc. to these engineering resins if desired.

In addition, the melt and pour cast process can be used with my wheel hub body 20 for other than engineering resins, e.g., low cost polyurethanes as well as other various wheel tread materials. My invention uses no such electrical material conducting elements to carry any electrical currents. When the material cools, contraction takes place. This is known as material shrink. This material shrink provides additional locking force for the tread after it fills the tread locking circular groove as well as locking onto the outer circumference of the hub. The material exhibiting a certain amount of compression strength is locked in the locking circular grooves.

The tread 13 cannot be pulled out. This is locking in one axis radially. The tread 13 cannot be pulled from side to side. This is locking in the second axis axially. The tread 13 cannot spin around the wheel hub. This is locking in the third axis tangently to radius. This completes a three-axis lock.

"These locking circular grooves are specially designed with minimum depth and specific ratios due to meet the specific characteristics of Isoplast requiring thin section thicknesses of material to obtain strength of material as stated by the material manufacturer."

Materials that exhibit little or no material shrink are further locked circumferentially (tangently to radius) by a geometric wrap within the locking circular groove resulting from the offset (39) between axis centerline 38 of the eccentric locking circular groove to bearing centerline axis 37.

The offset of the axes 39 sets up a wedging action locking the tread material 13 to wheel hub body 20 as tread is forced around circumferentially in one direction while hub is turned in the opposite direction, approximately one-third turn but not to exceed one-half turn. This is desired when there is no material shrink. When there is no offset between the axes, circumferential locking can be obtained by using an adhesive 25, or channels 8 (discussed further on in this patent application) specially and exclusively designed for the Isoplast$^R$ and Victrex Peek$^R$ tread material 13. As mentioned now one such adhesive that can be used is a one-part epoxy having the trade name of Accuthane, its an Isocyanate based product, having the chemical name of Methylenebis (phenylisocyanate). The ingredients of this one-part epoxy consist of this Methylenebis Phenylisocyanate being about 30% and about 10% of Aluminum Oxide, and about 10% Silica-Amorphus and other epoxy ingredients, Part No. UR1100, manufactured by H. B. Fuller Company, in Grand Rapids, Mich.

The epoxy adhesive 25, can also be used for better adhesion and sealing between tread material 13 and the wheel hub body 20, as well as to have a locking circular groove or grooves with sides 5 and 6 being parallel instead of being on angles as shown in FIGS. 1–12. The adhesive 25, when used will prevent pull-out of tread material 13, from the locking circular groove or grooves.

This epoxy hardens rapidly when brought to the temperature of about 160° F., when the hot resin hits the wheel hub body 20 (commonly known as the insert when used in the injection molding process) coated with this epoxy in the wheel mold for wheel tread 13 molding during the injection molding process there are some grades of aluminum used as the insert or wheel hub that can reflect the heat during molding and aid in producing a better finished wheel tread 13. The engineering thermo plastic resin product after properly being molded with full mechanical properties primarily to be used with the wheel tread lock groove invention is, a rigid engineering thermoplastic urethane material somewhat harder in Durometer rating, that will provide an excellent qheel tread for heavy loads and tough running conditions, which also is classified as a high-heat resin is called "Isoplast$^R$ grade 202."

The ingredients of this grade of 202 Isoplast$^R$ are Polyurethane from 4, 4'-Methylene Diaphenyl Diisocyante, 1, 4-Cyclohexane Diamethanol >88% Acrylic Polymer Modifier 10%. These ingredients are about the same basically with percentages of chemical makeup varying for other grades of Isoplast and with the addition of glass fibre content for the glass reinforced grades of Isoplast.

The Isoplast product mentioned here as well as all other grades of Isoplast, e.g., grades 101, 151, 201, 202, 300, 301, 302, 101LGF40, 101LGF60, 202LGF40, 202LGF60, etc., are manufactured by Dow Chemical Company, Midland, Mich. This material is an amorphous resin with crystalline properties. It is in the engineering resin group. Isoplast will not creep and elongate like other materials with crystalline properties. Another engineering thermo plastic resin family for high-heat performance which can be used for a tread material 13 and also as a bearing material is "Victrex$^R$ Peek (Polyetheretherketone). It is a high temperature engineering thermo plastic. Grade 450 G can be used for special wheel tread material 13. It is strong, tough and rigid with very good chemical and radiation resistance significantly, its excellent mechanical properties are high temperatures (above 400° F.).

This extremely valuable combination of properties unique in a thermo plastic material, results from the linear aromatic structure of Victrex$^R$ Peek. The chemical formula structure

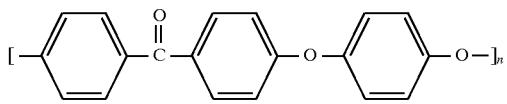

is representative of Peek. This material is avail from ICI Materials, a business unit of ICI Americas Inc., located in Exton, Pa. Victrex Peek like Isoplast will not creep and elongate as other engineering resins with crystalline properties do.

An example of such a material with crystalline properties that has creep and elongation is Nylon either with or without glass additives. The internal wheel bearing bore 12 runs axially through the wheel hub body 20 and is concentric to the outer circumference 9 of wheel hub body 20. This internal wheel bearing bore 12 is machined in one continuous operation thereby making the internal wheel bearing bore 12 absolutely straight. This feature enables the wheel bearings numbers 14 to always be in perfect alignment with a true running axis.

FIG. 1 shows the general set-up of the locking circular groove area 31 with a uniform groove depth 26 exhibiting a ratio of about 4 to 1 to about 8 to 1 dimensionally for radii 1 and 2 to groove depth 26 around the wheel hub, and the locking circular groove having its centerline axis concentric to the internal wheel bearing bore 12, that is concentric to the centerline axis of rotation 37.

FIG. 2 shows a locking circular groove similar to that of FIG. 1 with the addition of channels 8. Channels 8 can be notches or straight splines 8 running axially in position to internal wheel bearing bore 12 on a slight angle offset several degrees from the centerline axis 37 of rotation, the result of the actual machining whereby the supporting wheel arbor axis fixture is higher on one end instead of being parallel to the vertical milling machine "Y" (left to right) table axis during machining with the rotating woodruff style cutter in the milling machine spindle while the milling machine is in operation during machining of channel grooves 8. This practice was done to avoid chatter and this trade secret is now disclosed. These channels are formed with a shallow depth and have either angled side walls or straight perpendicular side walls with its base being concave and located in the concave radius 7 which is the preferred embodiment or in straight surface 11 between corners 3 and 4 that run circumferentially in the bottom of the locking circular groove.

The channels 8 and the depth of the channels 28 are used to provide an additional amount of positive locking power to stop any tread spin around the wheel hub.

FIG. 3 shows the general set-up of the locking circular groove around the wheel hub having its centerline axis 38 being eccentric to the internal wheel bearing bore 12 centerline axis 37 along with an internal channel in the bearing bore 12. The locking circular groove can be placed in the center, or it can be placed to the right or left side of the wheel hub if necessary. There can be one or more locking circular grooves depending on the amount of tread lock desired as well as the width of the wheel hub. The stronger the compression factor of the material being bonded, the stronger the bond to the wheel hub body 20. The major depth 34 of the locking circular groove is spaced 180° from the minor depth 33 being directly over the material missing from the lubricant channel 22 in the internal wheel bearing bore 12. The dimension of offset is determined by the amount of weight of material removed from this lubricant channel in the bearing bore. The amount of volume of weight is then transferred to dimension of depth difference between minor and major depths. This practice is done to dynamically balance the wheel hub body 20, thus providing vibration-free performance at high speeds in wheel operation. In hubs without lubricant grooves, the offset of the axes 39 can be kept to a minimum or zero.

The width of the opening to the locking circular groove 29 should be wide enough to provide a sufficient cross sectional area of material tread width to give a necessary amount of tensile strength to prevent breakage at this area from the rolling load conditions when in use. Also to have a sufficient ratio of about 2 to 1 to about 4 to 1 for width to depth to allow proper flow of injected tread material 13 into the locking circular groove area 31 further assisted by the radii 1 and 2 which allows maximum ease of molten tread material 13 to flow in the locking circular groove internal circular corners 3 and 4 without a radius between 3 and 5, 4 and 6. The ratio chosen for a specific application will generally depend on the tensile strength and the compression strength of the tread material 13. The locking surface angles 30 of sides 5 and 6 can range from less than 90° to forming an angle small enough that will just permit the entry of the molded on tread that will flow into the internal circular corners 3 and 4 of the Locking Circular Groove. (This is for FIGS. 1–12. With respect to FIGS. 13–16 the angle from sides 5 or 6 to the concave radius 7 or to the straight surface 11 is 90° respectively for each side measured.) The angle is measured from sides 5 or 6 to straight surface 11 typically shown for the FIGS. 1–12. The locking surface angles 30 can range from a minimum of about 15° to a maximum of about 90°.

For the best performance the harder and the more tensile strength the tread material 13 has the larger or steeper the angle can be. A locking surface angle 30 of 60° would give good holding strength along with a major depth of approximately 0.25" for materials of rubber to various metals for the wheel tread material 13.

The width of the locking circular groove 29 between 1 and 2 should be wide enough to provide sufficient cross section of material tread width that will provide an amount of tensile strength in pounds per square inch but not too wide in relation to locking circular groove depth 26, or 33, 34 providing a ratio of about 2 to 1 to about 4 to 1 depending on hardness of tread material 13. This ratio results in positive bonding hold down force. The depth of the locking circular groove should be limited by providing sufficient thickness of wheel hub material between locking circular groove or grooves depth surfaces 7 or 11 and the inner bearings 14, depth stops 16, snap rings 15, grooves with 17, thrust bearing counter bore depth so as to provide protection against breakthrough of wall material which would cause product failure.

FIG. 4 shows FIG. 3 with addition of channels 8 between corners 3 and 4 to provide an additional positive locking force, and with its locking circular groove centerline axis 38 being offset (39) and eccentric to the internal wheel bearing bore 12 centerline axis 37 of rotation.

FIG. 5 shows a locking circular groove with a concave radius 7 and having a depth designated as 27 between the sharp internal circular corners 3 and 4 of the internal circular locking inclined angle sides 5 and 6 of the locking dovetail groove with the use of this concave radius 7, the force necessary to pull out the tread material 13 from the locking gircular groove will be increased by 50 to 100 percent. There exists a definite ratio of about 2 to 1 to about 10 to 1 for this relationship depending on wheel tread support required. The lower this ratio is starting from a minimum of 2 to 1 the higher the percentage of pull out force that is required to pull out the tread material 13 from the locking circular groove. The higher this ratio is the lower the force that is required to pull out the tread material 13 from the locking circular groove. The ratio chosen for a specific application will generally depend on the tensile strength and the compression strength of the tread material 13.

The function of the concave radius 7 is to put the material in the locking circular groove under compression by putting the holding power in the bottom of the dovetail between sides 5 and 6 causing a wedging action in which material in the dovetail at the bottom tends to come together but cannot because of the depth 27 of the concave radius 7 (as shown in FIGS. 5, 6 and 9–12) which does not allow the tread material to do so, thereby retaining the wheel tread material and securely locking it to the wheel hub body 20. The deeper the depth 27 of concave radius 7 the stronger the holding power of the Locking Circular Groove. This affords the wheel tread lock an additional mechanical advantage not found in the prior art, that before the tread pulls out, the material will break at point of inner tread surface 10 adjacent to circumference surface 9.

FIG. 6 shows FIG. 5 with addition of channels 8 between corners 3 and 4 to provide additional positive locking force.

FIG. 7 shows the basic Locking Circular Groove of FIG. 1 being concentric to internal wheel bearing bore 12 and having bulbs 18 and 19 (bulbs to mean a convex extension of radii 1 and 2) protruding from the ends of sides 5 and 6 forming new corners 23 and 24 contacting these sides 5 and 6 respectively as shown in FIGS. 7–12, being at the entrance of the locking circular groove adjacent to the circumference surface 9 in place of radii points 1 and 2 in the locking circular groove.

These bulbs 18 and 19 run circumferentially as they are adjacent to surface 9. These bulbs can be used for very soft tread material, if desired. These bulbs have the same definite radii approximately as radii 1 and 2, and about the same ratio of about 5 to 1 in relationship to the depth of the locking circular groove bottom surface, 7 or 11.

FIG. 8 shows FIG. 7 with addition of channels 8 to provide additional positive locking force, with locking circular groove being concentric to internal wheel bearing bore 12.

FIG. 9 shows the eccentric locking circular groove of FIG. 3 with concave radius 7 in the bottom of the locking circular groove in place of the straight surface 11, and with the addition of protruding bulbs 18 and 19, with locking circular groove being eccentric to internal wheel bearing bore 12.

FIG. 10 shows FIG. 9 with the addition of channels 8 to provide an additional amount of positive locking force and locking circular groove being eccentric to internal wheel bearing bore 12.

FIG. 11 shows FIG. 5 with addition of protruding bulbs 18 and 19 and the locking circular grooves being concentric to internal wheel bearing bore 12.

FIG. 12 shows FIG. 11 with the addition of channels 8 to provide additional positive locking force and the locking circular groove being concentric to internal wheel bearing bore 12. The locking dovetail grooves shown are for FIGS. 1–12 respectively.

FIG. 13 shows a locking circular groove with sides 5 and 6 being parallel and at 90° to the concave radius 7 in the bottom of the locking circular groove running axially and the locking circular groove having its centerline axis concentric to the internal wheel bearing bore 12, that is concentric to the centerline axis of rotation 37. The one part epoxy adhesive can be used to secure the wheel tread from turning on the hub with this locking circular groove design, if desired.

FIG. 14 shows FIG. 13 with addition of channels 8 and the locking circular groove being concentric to internal wheel bearing bore 12. Concave radius 7 is in the bottom of the locking circular groove running axially.

FIG. 15 shows FIG. 13 with the locking circular groove having sides 5 and 6 being parallel and at 90° to the concave radius 7 in the bottom of the locking circular groove running axially and the locking circular groove being eccentric to internal wheel bearing bore 12. With this locking circular groove design, the one part epoxy adhesive is usually not required because of the eccentric locking circular groove design which prevents any circumferential turning.

FIG. 16 shows FIG. 15 with addition of channels 8 and the locking circular groove being eccentric to internal wheel bearing bore 12. Concave radius 7 is in the bottom of the locking circular groove.

The UR-1100 epoxy adhesive is used exclusively for Isoplast and Victrex Peek to hold in the tread material 13, for some applications. These locking circular grooves shown in FIGS. 13–16 with sides 5 and 6 being parallel provide maximum bearing surface support for the underlying tread inner surface 10 of the tread material 13. The eccentric offset grooves shown in FIGS. 15 and 16 provide positive locking circumferentially, for the tread material 13. They also have the benefits of the locking circular dovetail grooves with the same ratios and radii 1 and 2, to prevent any damage to tread material 13, where the inner surface 10 contacts the circumference 9 on the wheel hub body 20.

The locking circular dovetail grooves (shown in FIGS. 1 to 12 and in FIGS. 24 and 25) have the following features, there are definite visible radii distinct and sufficient in size, also with a ratio of about 5 to 1 of radius dimension to depth of the locking circular groove bottom surface 7, and put the holding power on the lower portion of the sides 5 and 6 of the locking circular groove instead of at the usual top portions or points along the circumference 9 of wheels shown in the prior art.

Also to provide an amount of ductility necessary for various tread materials such as the Isoplast$^R$ grade 202 resin, (without any glass fibre content), and the remaining Isoplast family of resins for other specific tread materials if desired, the Victrex$^R$ Peek resins, some of which can be used for bearing materials. An example of one such material is the Victrex$^R$ Peek resin designated as 450FC30. Also there are other resins that can be used for tread or tire material, and others that can be used as bearing material, etc., between the material in the locking circular groove and the flexing tread in contact with the operating surface or floor. Ductility will reduce to a minimum the fatiguing at the radii points 1 and 2 which can cause separation between material in the locking groove and within the working tread below its point of surface contact 10 adjacent to circumference 9.

To allow proper flow of tread, additionally, these radii 1 and 2 surrounding outer circumferences of the locking dovetail groove to aid in filling of dovetail groove or grooves having sharp internal corners 3 and 4 (sharp corners can also be replaced with round concave corners if desired) of dovetail groove or grooves with sides 5 and 6 to complete wedging action.

Additionally, this radius will supply a structural anchoring point without any possible splitting of tread during rolling under load. A concave surface 7 in the bottom of the groove between the lower dovetail sides, sufficient in radius depth from a straight line across and 4 exhibiting a ratio of about 2 to 1 to about 10 to 1 to put the material bonded under compression between the lower portion of dovetail sides 5 and 6 which will not permit the wheel tread material to pull out of the locking circular groove when in rolling motion or under static loading conditions. This compression resulting from heavy loads is contained between the dovetail sides 5 and 6, and radii 1 and 2 without spreading apart, which would result in tread material 13 being pulled out of the locking circular groove.

The wedging action takes place between the bottom of the locking circular groove 7 and the outer circumference 9, this is the result of the circular incline plane developed because of the tapering between surfaces 7 and 9 as the tread material 13 is forced between 7 and 9. The wedging action is further caused as the wheel tread 21 outer diameter surface contacting the road surface and resists normal turning, the wheel hub also resists turning on its axis normally as the pallet jack machine is at rest or in motion, e.g."a body at rest tends to stay at rest," (this is a part of Newton's scientific law).

The above features provide maximum holding power with maximum width and minimum depth of dovetail groove or grooves for tread locking circular grooves around the wheel hub circumferentially. This results in maximum bearing surface from wheel hub outer diameter circumference 9, to inner tread surface 10.

The scope of this invention should not be limited by the number of locking circular grooves on the wheel hub body 20, or by any other quantitative element that could vary, e.g., size, number, etc., that is mentioned above.

Tread locking is accomplished preferably by the features listed herein using a locking circular groove or grooves with a specific ratio between depth of the groove or grooves and specific radii at the entrance of the locking circular groove or grooves along with the newly created concave radius having a specific ratio of about 5 to 1 to about 10 to 1 with relation from depth to width in the bottom of the locking circular groove or grooves if more than one locking circular groove is used.

While I have herein shown and described one embodiment of the invention, and have suggested certain changes and modifications thereto, it will be apparent to those of ordinary skill in the art who have read this description that still further changes and modifications may be made therein without departing from the spirit and scope of the invention.

CIP DESCRIPTION OF THE EMBODIMENT

The present invention is far superior to the previous invention in that full use is made of the Isoplast$^R$ grade 202 manufactured by Dow Chemical Company, located in Midland, Mich.

The ingredients of this grade of 202 Isoplast$^R$ are Polyurethane from 4, 4'-Methylene Diaphenyl Diisocyante, 1, 4-Cyclohexane Diamethanol >88% Acrylic Polymer Modifier 10%. These ingredients are about the same basically with percentages of chemical makeup varying for other grades of Isoplast and with the addition of glass fibre content for the glass reinforced grades of Isoplast. This material is an amorphous resin with crystalline properties. It is in the engineering resin group Isoplast$^R$ will not creep and elongate like other materials with crstalline properties.

Victrex Peek$^R$ is another engineering themoplastic resin for high heat performance which can be used for a tread material 13 and also as a bearing material. Victrex Peek$^R$ (Polyetheretherketone) is a high temperature engineering thermo plastic. Grade 450G can be used for special wheel tread material 13. It is strong, tough and rigid with very good chemical and radiation resistance significantly, its excellent mechanical properties are high temperatures (above 400° F.)

This extremely valuable combination of properties unique in a thermo plastic material, results from the linear aromatic structure of Victrex$^R$ Peek. The chemical formula structure

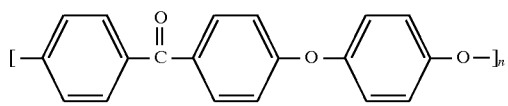

is representative of Victrex PeekR. Victrex PeekR like IsoplastR will not creep and elongate as other engineering resins with crystalline properties do.

An example of such a material with crystalline properties that has creep and elongation is nylon either with or without glass additives.

Victrex Peek$^R$ grade 450G available from ICI Materials, a business unit of ICI Americas Inc., located in Exton, Pa.

In their basic standard forms and in their use as matrixes, a matrix holds the additional additives while alloying with e.g. C-60, C-76 pure carbon fiber content, carbon fibers, Penlon$^R$ etc. providing additional benefits e.g. abrasion resistance, additional tensile strength with extra load capacity etc. The Isoplast$^R$ 202 or the Victrex PeekR 450G to be alloyed with C-60, C76 pure carbon fiber content available from Exxon Corporation located in Annadale, N.J. featuring diamond hardness while forming a super strength compound several times harder and stronger than the commercial type of carbon fiber such as Thornel$^R$ being either Pan type or Petroleum residue type available from Amoco Corporation, located in Alphareta, Ga. in approximately ¼" chopped length by 7 to 10 micron size diameter. These carbon fiber content materials when added to the Isoplast$^R$ grade 202 and Victrex Peek$^R$ grade 450G have produced unexpected superior strengths after being compounded and extruded into pellet form by a toll compounding company and then molded in an injection molding machine under the following criteria;

The engineering thermoplastic polyurethane designated as Isoplast$^R$ 202 for tread material 13 of my invention is molded around the wheel hub body 20, made of either metallic or non metallic material preferably in a 2024, 2219 or 6061 grade of aluminum either solid or hollow in the form of tubing to repel the heat of the molten resin and be the opposite of a heat sink to improve the molding specifications and properties, this is achieved by keeping the heat in the molded Isoplast$^R$ 202 and Victrex Peek$^R$ 450G material. This was found and noted through molding tests of material runs. The 2024, 2219 or 6061 possess the necessary chemical makeup necessary to produce these results.

By using various molding methods; e.g., the injection molding process for molding the wheel tread 13 for Isoplast$^R$ or Victrex Peek$^R$ consists of using a horizontal or vertical molding machine, with properly dried and heated engineering resin from a dessicant dryer and then inserted in the molding machine hopper with the barrel feeder heated to high heat then injected into a wheel mold where there is a wheel hub 20 (insert) that is placed in the center over the ejection ram, then the cover is closed by the injection molding machine. Next, the Isoplast$^R$ or Victrex Peak$^R$ materials are injected in through the cover through the sprue bushing and forced through the gating by pressure, then around the wheel hub (insert) and then allowed to cool to a set temperature or a preheated low mold temperature if desired. Then the molding machine opens with the cover attached and the ejection ram pushes against the bearing placement snap ring 15 and out comes the finished molded wheel tread 13 on the wheel hub 20 now called a wheel product. Color concentrate containing carbon or other additives can be added for color with improved abrasion resistance that is needed in wheel tread material 13 for load wheels, etc. to these engineering resins if desired.

The settings generally used for the injection molding process to mold Isoplast$^R$ 202 and other grades of Isoplast$^R$ and Victrex Peak$^R$ 450G and other grades of Victrex Peak$^R$ consist of using high heat in the barrel and in the nozzle injection ports, of approximately 460° F. for Isoplast$^R$ and approximately 750° for Victrex Peak$^R$ with these resin materials to be dried in a dessicant dryer with a dew point temperature to be from 20° to −60° Farenheit with a moisture content to be from 0.01% to 0.001%, prior to being put in the injection molding machine hopper. A carbon black color concentrate can be added with the resin having a ratio of from <1% to >50% of the total resin amount.

These settings are designed to supply bonding between extremely difficult to bond materials, such as Isoplast$^R$ grade 202, a rigid polyurethane, an amorphous resin with crystalline properties having a load rating of at least ten times that of the best domestic or foreign made material overseas. The tensile strength load rating of Isoplast$^R$ 202 is 9,000 pounds per square inch with a compression load rating of 11,500 per square inch. With the addition of the C-60, C-76 the compression load rating is increased by as much as 10 times. With the addition of the commercial fiber content the compression strength can be increased by 10 times as well.

The tensile strength load rating of the best domestic or foreign made material is from 800 to 900 pounds per square inch with a compression load rating of about 900 pounds per square inch.

The carbon fiber content added for alloying with the matrixes of Isoplast$^R$ 202 or Victrex Peak$^R$ 450G can be as high as more than half of the total quantity of the resin mixture.

Additionally, another material that can be added forming alloys when Isoplast$^R$ 202 or Victrex Peak$^R$ 450G are used as matrixes providing additional abrasion resistance is a Teflon$^R$ type of material known as Penlon$^R$ also available in small micron size of from 7 to 15 micron size diameter for injection molding with the Isoplast$^R$ 202 or the Victrex Peak$^R$ 450G is available from the Furon Company located in Anaheim, Calif.

An alternate material such as Victrex Peak$^R$ 450G has tensile and compression ratings of about 50% higher than Isoplast$^R$ 202 as well as non-bondable materials with a wheel hub body designated as 20.

Isoplast$^R$ grade 202 is an impact modified engineering resin that is highly resistant to acids and chemicals.

The wheel hub body 20 is made of metal although it can be made of any other suitable rigid material, e.g., metal tubing, metal castings, that can have the locking circular grooves cast into the wheel hub body 20 with concave radii 7, internal locking channels 8, etc., described further on as well as non metallic materials that are capable of supporting a load either for dynamic or static conditions.

In addition, the melt and pour cast process can be used with my wheel hub body 20 for other than engineering resins, e.g., low cost polyurethanes as well as other various wheel tread materials. Some inventions have used heating elements for molding the wheel tread.

My previous invention and the present invention use no such electrical material conducting elements to carry any electrical currents for molding. After the material is heated in the injection molding machine and then injected into the mold, the material cools, then contraction takes place. This is known as material shrink. This material shrink provides additional locking force for the tread after it fills the inner tube perforated liner bore 54 for FIGS. 19 to 21 and the circumferencial locking ring 66 for FIGS. 22 and 23 through entry holes 65 and tread locking circular grooves as well as locking onto the outer circumference of the roller shaft assembly shaft 75 and wheel hub 20.

Materials that have little or no material shrink can be locked in place by offseting the locking circular groove axis from the axis of rotation thereby creating an eccentric circumferential lock against turning as shown in the previous patent and in FIGS. 21 and 23 of the present invention. This eccentric circumferential lock is especially useful in a driving wheel or roller shaft assembly 75, providing tremendous locking on force against any possible circumferential turning. This establishes a three axis lock when used in a locking circular groove as shown in FIGS. 21 and 23.

The material exhibiting a certain amount of compression strength is locked onto the inner tube perforator liner 60 and the circumferencial locking ring 66 when the IsoplastR 202 and Victrex PeekR 450G are properly molded filling the inner bore 54 of the inner tube perforated liner 60 the material cannot pull out due to the strength of the created fasteners (rivet type) connecting inner bore tread 54 to outer bore tread 13 due to the transfering of the pullout force equally distributed and divided by the created fasteners situated around the entire circumference and the opposite side 1800 around from the point of the attempted pull out while the inner tube perforated liner 60 is in a concentric position over and surrounding the locking circular groove 11 in the wheel outer circumference 9 of the wheel hub body 20 and concentrically situated around the roller shaft assembly 75 as well. 53 This bonding is achieved with the wheel tread locking groove taking advantage of the shallow depth from wheel hub outer diameter (circumference 9) to bottom of wheel tread locking groove 11. The wheel tread lock groove is also known as the locking circular groove having an angle 30 preferably of 90° FIGS. 1–17 and 19–26 show one locking circular groove on each wheel hub 20, with locking groove 79 in roller shaft assembly shaft 25. In the making of wheel hub body 20, it is made with one or more locking circular grooves in proportion to its width to take advantage of maximum retaining force as well as providing maximum support for the wheel tread 13 while in rotation and under load use conditions. The following locking circular grooves shown and described herein for FIGS. 1 through 17 and 19–26 can be made with special form or regular cutting tools on conventional lathes and other standard machine shop machinery using conventional machine practices, and other related various industrial practices. This is necessary to have the locking circular grooves match the shape of the form tool. The tread of the track tread cleat assembly 80 is bonded to the mounting plate 81 with an adhesive 25 or is bolted through holes 65. In the case of FIG. 24 the dovetail grooves 71 can achieve a specific ratio for outer opening width of the locking circular groove 29 to the total of dovetail depth 26 plus depth of concave radius 7 or flat bottom groove 11 to be 1 to 1 to 8 to 1 if so desired.

The actual ratio may be dictated by the hardness and tensile strength of the tread material 13. The ratio is chosen to give the best bonding or retaining force for the selected tread material 13. The ratio for radii 1 and 2 to depth 26 which is about 4 to 1 to about 8 to 1 for concentric locking circular grooves or 33 and 34 for eccentric locking circular grooves.

The present invention uses the above criteria and ratios for FIG. 24 and FIG. 25 and on some wheel hubs or roller shaft assemblies FIG. 26 if needed.

The preferred embodiment for the best tread locking consists of having the strongest tread material, Isoplast$^R$ 202 or Victrex Peek$^R$ 450G securely fastened to a wheel hub made of either metallic or non metallic material, either solid or tubular in shape to its outer circumference 9 as shown typically in FIGS. 19 through 21 (or can be around a roller shaft assembly 75 made of either metallic or non metallic material, either solid or tubular in its shape around circular groove 79 in FIG. 26) is achieved through the use of an inner perforated tube liner 60 made of either metallic or non metallic material with straight parallel holes 65 either punched or drilled around its outer periphery (funnel shaped countersunk holes for flat section material 60 used in FIG. 27) having a continuous circumference without a seam opening preferably but not necessary in the case of heavy wall material thicknesses centered concentrically over the wheel hub locking groove 11 by support flange bushings 61 held in place from axial movement by two outer O.D. snap rings 62 in two O.D. snap ring grooves 64 preferably located either side of the centerline of the locking circular groove 11 or 7 to a predetermined depth stop of 63 for each side of the wheel hub respectively.

Secondly an alternate design of tread locking is shown in FIGS. 22 and 23 using a hollow half round circumferential locking ring 66 completely filling the locking circular groove 360° having an inner cavity formed by the inner radius 67 on the inside and an outer radius 55 on the outer periphery in place of the inner perforated tube liner 60 with its ends joined together preferably but not necessary in the case of heavy wall material thicknesses by welding or through the use of a connecting link after being fitted into the locking circular groove 7. This circumferential locking ring 66 sets up conditions equal to the inner perforated tube liner 60 during the molding operation either the injection molding process or the melt and pour cast process creating fasteners as described further on.

FIG. 19 shows a wheel and tread locking assembly with its locking circular groove 11 being concentric to the center axis of rotation that can be supported by ball bearings 14 and 14 either side respectively as shown in FIGS. 19 to 23 with the above set up, whereby the molten tread material 13 from the injection molding machine comes through entry holes 65 located around the outer periphery 55 of the inner perforated tube liner 60 filling the inner groove space 31 from the bottom of the locking circular groove 11 to the inner bore surface 54 with a sufficient dimension to create one or more effective rivet heads in the inner groove space 31 of the inner perforated tube liner 60 forming one or more rivet heads on the tread material 13 coming through the straight parallel entry holes 65 for FIGS. 19 to 23 and expelling any trapped gases through exhaust ports 68 and 68 located on either side of the wheel hub outer circumference 9 respectively. The tread material 13 is now entirely surrounding the inner perforated tube liner 60 whereby one or more fasteners are created (e.g. rivets) whereby the determined size of the created fastener in diameter is equal to the cross section diameter size of the one or more holes 65 situated around the peripherary 55 of the inner perforated tube liner 60.

The cross sectional area of the created fasteners multiplied by their number will give the holding force in pounds per square inch.

The tread material 13 cannot pull out as it is riveted or fastened to the inner perforated tube liner 60 which is centered around the outer wheel hub circumference 9 or roller shaft 25 of the roller shaft assembly.

Circumferencial turning between the inner surface 10 of tread 13 and outer circumference 9 of wheel hub 20 can be eliminated by the material shrink locking the tread 13 onto the outer circumference 9 of the wheel hub 20. Circumferential locking can be achieved by an eccentric axis of the locking circular groove in relation to the axis of wheel rotation. This amount of offset between the axes 39 can be kept to a minimum and still provide sufficient locking force.

Materials that exhibit little or no material shrink are further locked circumferentially (tangently to radius) by a geometric wrap within the locking circular groove resulting from the offset (39) between axis centerline 38 of the eccentric locking circular groove to bearing centerline axis 37.

The offset of the axes 39 sets up a wedging action locking the tread material 13 to wheel hub body 20 as tread is forced around circumferentially in one direction while hub is turned in the opposite direction, approximately one-third turn but not to exceed one-half turn. This is desired when there is no material shrink. When there is no offset between the axes, circumferential locking can be obtained by using an adhesive 25, or channels 8 (discussed further on in this patent application) specially and exclusively designed for the Isoplast$^R$ and Victrex Peek$^R$ tread material 13. As mentioned now one such adhesive that can be used is a one-part epoxy having the trade name of Accuthane, its an Isocyanate based product, having the chemical name of Methylenebis (phenylisocyanate). The ingredients of this one-part epoxy consist of this Methylenebis Phenylisocyanate being about 30% and about 10% of Aluminum Oxide, and about 10% Silica-Amorphus and other epoxy ingredients, Part No. UR110, manufactured by H. B. Fuller Company, in Grand Rapids, Mich.

The epoxy adhesive 25, can also be used for better adhesion and sealing between tread material 13 and the wheel hub body 20, as well as to have a locking circular groove or grooves with sides 5 and 6 being parallel instead of being on angles as shown in FIGS. 1–12.

The adhesive 25, when used will prevent pull-out of tread material 13, from the locking circular groove or grooves.

This epoxy hardens rapidly when brought to the temperature of about 165° F., when the hot resin hits the wheel hub body 20 (commonly known as the insert when used in the injection molding process) coated with this epoxy in the wheel mold for wheel tread 13 molding during the injection molding process there are some grades of aluminum used as the insert or wheel hub that can reflect the heat during molding and aid in producing a better finished wheel tread 13. The engineering thermo plastic resin product after properly being molded with full mechanical properties primarily to be used with the wheel tread lock groove invention is, a rigid engineering thermoplastic urethane material somewhat harder in Durometer rating, that will provide an excellent qheel tread for heavy loads and tough running conditions, which also is classified as a high-heat resin is called "Isoplast$^R$ grade 202."

The UR-1100 epoxy adhesive is used exclusively for Isoplast and Victrex Peek to hold in the tread material 13, for some applications.

The locking circular grooves shown in FIGS. 13 to 23 with sides 5 and 6 being parallel provide maximum bearing surface support for the underlying tread inner surface 10 of the tread material 13 for FIGS. 13 to 21 and bearing surface support for locking circular rings 66 as shown in FIGS. 22 and 23. The eccentric offset grooves shown in FIGS. 15 and 16 provide positive locking circumferentially, for the tread material 13. They also have the benefits of the locking circular dovetail grooves with the same ratios and radii 1 and 2, to prevent any damage to tread material 13, where the inner surface 10 contacts the circumference 9 on the wheel hub body 20.

Given this design a far superior locking tread system has been invented surpassing all other tread locking devices for wheel, roller and track tread cleat applications, through the use of a perforated material section primarily round for FIGS. 19 to 23 forming a perforated tube 60 with one or more holes 65 through the cross section from its outer periphery 55 to its inner bore 54 or having the material section with the one or more holes 65 in a shape other than round being substantially flat for FIG. 27 having one or more funnel shaped countersunk holes facing and fastened to a mounting plate surface 81 by bolts 85 through bolt holes 83 whereby a space would be between the mounting plate surface 81 and the countersunk hole allowing tread material 80 to expand in the funnel shaped countersunk portion of the hole or holes that will form one or more rivet type fasteners from surface 81 to the inner tread material connection point 84 mating surface such as shown in FIG. 27.

FIG. 20 is the same type of wheel hub and tread locking assembly as FIG. 19 except having channels 8 to stop circumferencial turning.

FIG. 21 is the same type of wheel hub and tread locking assembly as FIG. 19 except having its locking circular groove being eccentric to the concentric axis of rotation to prevent circumferencial turning between the inner surface 10 of tread material 13 and the outer circumference 9 of the wheel hub 20.

FIG. 22 is the same type of wheel hub and tread locking assembly as FIG. 19, except it uses a circumferencial locking ring 66 in a locking circular groove 11 in place of the inner perforated tube liner 60, and its related parts. Achieving tread locking by having the one or more created fasteners around its half round outer periphary radius through the one or more holes 65.

FIG. 23 is the same type of wheel hub and tread locking assembly as FIG. 22, except having its locking circular groove being eccentric to the concentric axis of rotation to prevent circumferencial turning between the inner surface 10 of tread material 13 and the outer circumference 9 of the wheel hub 20.

FIG. 24 shows an inner tire liner made up of Isoplast$^R$ 202 or Victrex Peek$^R$ 450G providing substantial strength to support the weight when mounted in a automotive rubber tire 57 providing puncture proof operation of the tire and tube assembly from punctures on the sidewalls and on the treadwall portion of the rubber tire by stopping nails and other sharp objects puncturing through the inner tire liner 70 sidewalls and outer circumference 72 protecting the inner tube 56 that supports the inner tire liner 70 shape adjacent to the inner automotive tire 57 sidewalls and inner circumference surface of the road tread. The inner tire liner 70 is similar to an automotive pneumatic rubber tire 57 but smaller in size enabling it to be fitted and fastened on the inside of a conventional automotive rubber tire 57 by molding, preferably, on the tire rubber 57 to the dovetail locking grooves 71 on inner tire liner 70 or by some mechanical type of fasteners if so desired while being adjacent to the sidewalls and inner circumference of the tire tread.

An inner inflatable rubber tube 56 is in its hollow cavity 73 inflated through valve 43 coming through wheel support rim assembly 44. There are dovetailed locking grooves 71 on the sidewall portions and on the outer circumference 72 for molding on the rubber tire 57 on the sidewalls where dovetail locking grooves 71 are located and on the outer circumference 71 of the tire liner whereby the molded on rubber fills the internal dovetailed grooves 71, thereby locking on the rubber to the Isoplast$^R$ 202 or Victrex Peek$^R$ 450G.

The inner tire liner connection points 74 are located below the sidewall bead sections contacting the inner wheel rim assembly surface 44. This space between connection points 74 and 44 allows for flexing of the rubber tire allowing it proper function for usage on road surfaces.

FIG. 25 is a typical automotive pneumatic tire 57 for housing the inner tire liner 70 as shown in FIG. 24 with the inner tire liner 70 on the inside of the hollow pneumatic tire and the rubber tire 57 shown molded onto and around the inner tire liner dovetail locking grooves 71. Inflatable tube 56 is inside in inner tire liner 70, hollow cavity 73 with inflation valve 43 coming through wheels support rim assembly 44 for filling wheel, tire and tube assembly with air, thereby supporting the tire for road usage.

It is also possible for some applications of FIG. 24 and 25 to use an adhesive 25 to stop any circumferencial turning.

FIG. 26 is a typical roller and shaft assembly 75 with Isoplast$^R$ 202 or Victrex Peek$^R$ 450G molded on shaft 75 with tread 76 molded around outer circumferencial locking groove 79. Although not shown this typical roller and shaft assembly 75 can be on a plain flat shaft 75 without a locking circular groove 79 if so desired with only the side tread stops 77 and 77 respectively formed between two or more outer O.D. snap rings 62 and 62 in grooves 64 and 64 respectively.

FIG. 27 is a typical track tread cleat assembly used mainly on track vehicles e.g. tanks, armored personnel carriers and other equipment using track treads e.g. machinery conveyors, etc. instead of wheels, with a mounting plate 81 having a track tread material 80 fastened to it at connection point 84 through the use of a flattened perforated section previously discussed in description of FIG. 19 whereby a perforated flat section of material 60 with funnel shaped countersunk holes 65 is between connection point 84 and track tread material 80 whereby the tread material 80 is molded with the tread material going through entry holes 65 in the perforated flat section of material filling the countersunk funnel shaped holes thereby creating rivet type fasteners as previously described in FIG. 19 for securing a tread material in a minimal section thickness, whereby the perforated flat section of material is bolted to the mounting plate by bolts 85 in bolt holes 83.

The locking circular dovetail grooves (shown in FIGS. 1 to 12 and in FIGS. 24 and 25) have the following features, there are definite visible radii distinct and sufficient in size, also with a ratio of about 5 to 1 of radius dimension to depth of the locking circular groove bottom surface 7, and put the holding power on the lower portion of the sides 5 and 6 of the locking circular groove instead of at the usual top portions or points along the circumference 9 of wheels shown in the prior art.

Also to provide an amount of ductility necessary for various tread materials such as the Isoplast$^R$ grade 202 resin, (without any glass fibre content), and the remaining Isoplast family of resins for other specific tread materials if desired, the Victrex$^R$ Peek resins, some of which can be used for bearing materials. An example of one such material is the Victrex$^R$ Peek resin designated as 450FC30.

Also there are other resins that can be used for tread or tire material, and others that can be used as bearing material, etc., between the material in the locking circular groove and the flexing tread in contact with the operating surface or floor. Ductility will reduce to a minimum the fatiguing at the radii points 1 and 2 which can cause separation between material in the locking groove and within the working tread below its point of surface contact 10 adjacent to circumference 9.

To allow proper flow of tread, additionally, these radii 1 and 2 surrounding outer circumferences of the locking dovetail groove to aid in filling of dovetail groove or grooves having sharp internal corners 3 and 4 (sharp corners can also be replaced with round concave corners if desired) of dovetail groove or grooves with sides 5 and 6 to complete wedging action.

Additionally, this radius will supply a structural anchoring point without any possible splitting of tread during rolling under load. A concave surface 7 in the bottom of the groove between the lower dovetail sides, sufficient in radius depth from a straight line across 3 and 4 exhibiting a ratio of about 2 to 1 to about 10 to 1 to put the material bonded under compression between the lower portion of dovetail sides 5 and 6 which will not permit the wheel tread material to pull out of the locking circular groove when in rolling motion or under static loading conditions. This compression resulting from heavy loads is contained between the dovetail sides 5 and 6, and radii 1 and 2 without spreading apart, which would result in tread material 13 being pulled out of the locking circular groove.

The wedging action takes place between the bottom of the locking circular groove 7 and the outer circumference 9, this is the result of the circular incline plane developed because of the tapering between surfaces 7 and 9 as the tread material 13 is forced between 7 and 9. The wedging action is further caused as the wheel tread 21 outer diameter surface contacting the road surface and resists normal turning, the wheel hub also resists turning on its axis normally as the pallet jack machine is at rest or in motion, e.g."a body at rest tends to stay at rest," (this is a part of Newton's scientific law).

The above features provide maximum holding power with maximum width and minimum depth of dovetail groove or grooves for tread locking circular grooves around the wheel hub circumferentially. This results in maximum bearing surface from wheel hub outer diameter circumference 9, to inner tread surface 10.

The scope of this invention should not be limited by the number of locking circular grooves on the wheel hub body 20, or by any other quantitative element that could vary, e.g., size, number, etc., that is mentioned above.

Tread locking is accomplished preferably by the features listed herein using a locking circular groove or grooves with a specific ratio between depth of the groove or grooves and specific radii at the entrance of the locking circular groove or grooves along with the newly created concave radius having a specific ratio of about 5 to 1 to about 10 to 1 with relation from depth to width in the bottom of the locking circular groove or grooves if more than one locking circular groove is used.

While I have herein shown and described one embodiment of the invention, and have suggested certain changes and modifications thereto, it will be apparent to those of ordinary skill in the art who have read this description that still further changes and modifications may be made therein without departing from the spirit and scope of the invention.

I claim:

1. A roller and tread assembly comprising:

a hub insert having a cylindrical shape and including an outer peripheral surface, said hub insert being supported on a roller shaft having first and second ends, each end having bearing means disposed between said hub insert and said roller shaft;

a tread comprising a resilient material and being supported on said outer peripheral surface;

said hub insert further including a locking circular groove formed in said outer peripheral surface between the ends of the insert, a peripheral groove disposed at either side of said locking circular groove, and a flange bushing disposed on said outer peripheral surface between said locking circular groove and each of said peripheral grooves a perforated tube liner supported on said flange bushings over said locking circular groove to form a cavity between the tube liner and the outer periphery of said hub insert;

a snap ring disposed in each of said peripheral grooves for retaining said flange bushings and said tube liner;

said tread supported on said outer peripheral surface such that a portion of said tread material penetrating through said perforated tube liner to fill said locking circular groove of said hub insert.

2. An improved wheel, roller and track tread assembly as described in claim 1 wherein:

said wheel, and roller assembly has a continuous straight through bore with snap ring grooves to provide a depth bearing stop adjacent to either end thereof and to provide a precision continuous axis for wheel bearings rotation around a given shaft.

3. An improved, wheel, roller and track tread assembly as described in claim 1 wherein:

said wheel hub continuous locking circular groove has side walls that are formed in part by right angle sections extending around said wheel hub locking circular groove.

4. An improved wheel, roller and track tread assembly as described in claim 1 wherein:

said wheel hub and insert is hollow in shape and comprised of metallic material with said tread material having an Isoplast® chemical formula alloyed with pure carbon fiber content C-60.

5. A wheel roller and tread assembly comprising:

a cylindrical wheel roller insert having an outer periphery concentric to a center line axis of rotation;

a tread material supported on the outer periphery of said roller insert, said tread material being thermally bonded by injection molding to said roller insert;

said tread material comprising an amorphous resin alloy with crystalline properties;

said tread material further comprising: polyurethane from 4,4'-Methylene Diaphenyl Diisocyanate, 1,4-Cyclohexane Dimethanol of least 88% and Acrylic Polymer modifier 10%;

said resin alloy comprising Isoplast® and pure carbon fiber content C-60 and C-76, commercial fiber Thornel, and polytetrafluorethylene content.

6. A wheel roller and tread assembly comprising:

a wheel roller insert having an outer peripheral surface concentric to the center line axis of rotation;

said wheel roller comprised of a metallic material;

a tread thermally bonded to said peripheral surface by injection molding onto said insert;

said tread comprising a material having crystalline properties comprising straight molecular chains with benzine rings;

said tread is a linear, aromatic polyetheretherketone having a chemical formula structure

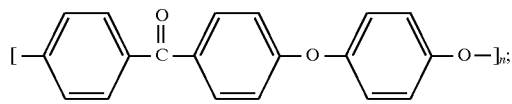

said material further comprising an engineering resin alloy of Victrex Peek® and pure fiber content, commercial fiber Thornel;

said Victrex Peek® chemical formula additionally comprising pure fiber content C-60 and pure fiber content C-76;

said Isoplast® being additionally comprised of polytetrafluorethylene content.

7. The wheel and roller tread assembly as set forth in claim 6;

wherein said tread is secured to said insert by an adhesive bonding material disposed between the tread material and the outer peripheral surface of said insert.

* * * * *